United States Patent [19]

Bixler et al.

[11] Patent Number: 4,921,934

[45] Date of Patent: May 1, 1990

[54] ALKALI-SOLUBLE POLYMERS AND PROCESS FOR PRODUCING SAME

[75] Inventors: Kathleen J. Bixler; Kevin M. Scholsky, both of Racine, Wis.

[73] Assignee: S. C. Johnson & Son, Inc., Racine, Wis.

[21] Appl. No.: 353,202

[22] Filed: May 12, 1989

Related U.S. Application Data

[63] Continuation of Ser. No. 137,119, Dec. 23, 1987, abandoned.

[51] Int. Cl.$^5$ ............................................. C08G 61/00
[52] U.S. Cl. .................................... 528/355; 528/354; 528/359; 525/69; 525/386; 524/504
[58] Field of Search .................. 528/354, 355, 359; 525/386

[56] References Cited

U.S. PATENT DOCUMENTS

| | | | |
|---|---|---|---|
| Re. 27,151 | 6/1971 | Hicks | 260/47 |
| 3,169,945 | 2/1965 | Hostettler et al. | 528/354 |
| 3,284,417 | 11/1966 | Hostettler et al. | 528/354 |
| 3,502,623 | 3/1970 | Hurworth et al. | 528/354 |
| 3,598,791 | 8/1971 | Nieuwenhuis et al. | 528/359 |
| 3,655,631 | 4/1972 | Fraser et al. | 528/354 |
| 3,760,034 | 9/1973 | Critchfield et al. | 528/354 |
| 3,892,714 | 7/1925 | Sampson et al. | 528/58 |
| 4,005,155 | 1/1977 | Sampson et al. | 525/162 |
| 4,082,816 | 4/1978 | Fisk et al. | 528/361 |
| 4,175,177 | 11/1979 | Potts | 528/354 |
| 4,412,061 | 10/1983 | Wu et al. | |
| 4,414,370 | 11/1988 | Hamielec et al. | 526/209 |
| 4,506,056 | 3/1985 | Gaylord | 525/301 |
| 4,529,787 | 7/1985 | Schmidt et al. | 526/209 |
| 4,546,046 | 10/1985 | Etzell et al. | 525/450 |
| 4,546,160 | 10/1985 | Brand et al. | 526/320 |

FOREIGN PATENT DOCUMENTS

1443073 12/1974 United Kingdom .

OTHER PUBLICATIONS

Vogl, Polymerization of Heterocycles, 1973, p. 119.
Encyclopedia of Polymer Sci. & Technology, vol. 11, Interscience Publishers, New York, 1969, pp. 98–106.
"Ring Opening Polymerization", vol. 3, by K. J. Ivin and T. Saegusce (Eds.), Elsevier Science Pub. Co., Inc., New York (1984), pp. 461–521, 975, and 978–979.
ASTM D 2794-84 (pp. 518–520) Standard Test Method.
ASTM D 3363-74 (pp. 670–671), 1980, Standard Test Method.
"Lactone Polymerization and Polymer Properties", by G. L., Brode & J. V. Kolseki, Published in J. Micromol. Sci.-Chem., A6(6), pp. 1109–1144 (1972).
"Ionic Graft Copolymerization, II., Graft Copolymerization of beta-Propiolactone onto Acrylonitrile-Sodium Acrylate Copolymer", by T. Shiota, Y. Goto & K. Hayashi, published in Journal of Applied Polymer Science, vol. 11, pp. 733–790 (1967).
"Ionic Graft Copolymerization. V., Graft Copolymerization of beta-Propiolactone onto the Trunk Polymers Containing Carboxylic acid, Sulfonic Acid & Other Salts", by T. Shiota et al., in Journal of Applied Polymer Science, vol. 12, pp. 2441–2461 (1968).
"Ionic Graft Copolymerization. VI., Graft Copolymerization of beta-Propiolactone & N-Vinylcarbazole onto Trunk Polymer Containing Carboxylic Acid, Sulfonic Acid, and Their Salts", by T. Shiota et al., pub. in Journal of App. Poly. Sci., vol. 12, pp. 2463–2480 (1968).
"Modification of Acrylic Polymers for High Solids Coatings", by A. N. Theodore & M. S. Chattha, pub. in Journal of Coatings Technology, vol. 54, No. 693, pp. 77–81 (Oct. 1982).

*Primary Examiner*—John C. Bleutge
*Assistant Examiner*—David Buttner

[57] ABSTRACT

A process for producing an alkali-soluble graft polymer is disclosed. The graft polymer has at least one main chain and a plurality of side chains attached thereto. The process comprises combining at least one vinylic monomer that is capable of forming free radicals, at least one ethylenically-unsaturated carboxylic acid monomer that is capable of addition-copolymerization with the vinylic monomer in the presence of the thus-formed free radicals, and cyclic ester molecules that are capable of ring-opening in the presence of the carboxylic acid monomer, to produce a polymerizable mixture. the polymerizable mixture to subjected to a preselected temperature and pressure for causing the monomers to free-radically addition-copolymerize to form the main chain while the cyclic ester molecules graft thereon, thereby forming the side chains of the graft polymer. The process is characterized in that the main-chain and side-chain formations of the graft polymer occur substantially simultaneously.

18 Claims, No Drawings

ALKALI-SOLUBLE POLYMERS AND PROCESS FOR PRODUCING SAME

This is a continuation of co-pending application Ser. No. 07/137,119 filed on December 23, 1987, now abandoned.

REFERENCE TO RELATED APPLICATION

This application is related to co-pending, commonly-assigned application Ser. No. 07/022,297, filed March 5, 1987.

TECHNICAL FIELD OF THE INVENTION

The present invention is generally directed to a polymerization process for producing certain alkali-soluble polymers. More particularly, the present invention is directed to a polymerization process that utilizes at least two different reaction mechanisms, which take place substantially simultaneously, to produce such polymers.

The present invention is also directed to the alkali-soluble polymers, briefly mentioned above, that are produced in accordance with the principles of, and as a result of utilizing, the novel process described herein.

BACKGROUND OF THE INVENTION

Graft polymers are well known. For example, U.S. Pat. No. 3,760,034 to Critchfield et al. generally discloses certain graft copolymers of lactone polyesters. More particularly, the Critchfield patent specifically teaches that such graft copolymers can be obtained utilizing lactone polyesters and ethylenically-unsaturated monomers. Along these lines, other investigators have reported development of a procedure for grafting caprolactone onto a low molecular weight hydroxy acrylic polymer in the presence of a dibutyltin oxide catalyst. (See Journal of Coatings Technology, October 1982, Volume 54, No. 693, pages 77-81.)

Briefly, a graft copolymer comprises at least one main chain and a plurality of side chains attached to each such main chain. U.S. Pat. Nos. 3,892,714 and 4,005,155, both to Sampson et al., disclose certain polymeric compositions comprising main chains, side chains attached thereto, and crosslinking units between side chains. Sampson et al. teach that the main chains consist of a copolymer of two or more ethylenically-unsaturated monomers (at least one of which contains hydroxyl groups) wherein the side chains consist of lactone chains attached to the hydroxyl groups. Still more particularly, Sampson et al. disclose in the '714 patent that the crosslinking units consist of a polyisocyanate such as di-isocyanate. In the '155 patent, Sampson et al. disclose that the crosslinking units consist of an amino resin such as urea formaldehyde, melamine formaldehyde, or benzoguamine formaldehyde.

Typically, a graft polymer is produced in a sequential manner, utilizing a series of steps. For example, one such polymer is first formed, utilizing a particular reaction step. Thereafter, the thus-formed polymer is utilized as a so-called "main chain" onto which certain side chains can be grafted. In particular, such a thus-formed polymeric main chain typically has side chains grafted thereonto via a subsequent reaction step. One method for forming such a graft polymer typically requires utilizing separate reaction vessels to accomplish the separate reaction steps. (See, e.g., Example 1 of U.S. Pat. No. 3,760,034 to Critchfield et al.)

It is also fairly typical, moreover, in conventional graft polymer-manufacturing processes (such as those mentioned above), to utilize a catalyst to effect the main-chain and/or the side-chain formation of the desired polymer product. See, e.g., British Pat. No. 1,443,073 to Bayne et al., which teaches that use of stannous octoate as catalyst is "essential" to achieve reaction of three ingredients in a single step. Also worthy of note in this regard is U.S. Pat. No. 4,082,816 to Fisk et al., a patent generally directed to the preparation of a caprolactone-modified acrylic polymer, wherein the inventors particularly point out that the polymerization medium "should include" a polymerization catalyst for the caprolactone. (See also U.S. Pat. Nos. 3,892,714 and 4,005,155, both to Sampson et al., which disclose using a catalyst such as an organic peroxygen compound, an organic peroxide, an organic hydroperoxide, or an azo compound such as 2,2'-azo bis-2-methyl propionitrile.) To use a catalyst to effect simultaneous main-chain as well as side-chain formation, however, is undesirable for a variety of reasons.

Generally, a catalyst is chosen so as to beneficially and optimally effect reaction of one particular catalytically-reactable ingredient. One disadvantage of utilizing such a catalyst to effect two or more chemical reactions via a one-step method is that such a catalyst, typically utilized to effect either the main-chain "formation" polymerization reaction or the side-chain "grafting" polymerization reaction, undesirably affects the reaction mechanism (or mechanisms) that it does not optimally effect. The reason is that certain catalysts, although necessary to cause one of these reactions to occur, can and typically do undesirably interfere with the other reaction. Such interference, in turn, may result in the production of a polymer having undesirable properties, may result in the production of an undesirable polymerization by-product that needs to be separated from the desired polymer product, or may give rise to some other unforeseen and undesirable result. For example, Brode et al. [J. Macromol. Sci.-Chem., A6(6), pp. 1109–1144 (1972)] present data (at pages 1116–1119), suggesting that utilization of certain catalysts renders certain polymer products thermally unstable.

More particularly, however, utilization of a specific catalyst, to effect desired side-chain "grafting" formation, may cause undesired side-chain formation such as so-called "transesterification" to take place at the main-chain portion of the polymer. Transesterification, in turn, generally results in the occurrence of undesired crosslinking taking place during the side-chain "grafting" step. This is undesirable, as was briefly indicated above, because such crosslinking tends to increase the viscosity of the thus-produced graft polymer, and may even result in the gellation of the polymer product or products so produced, which is generally undesirable.

Accordingly, from an engineering standpoint, from a capital-investment standpoint, from a manpower-utilization standpoint, from an equipment-scheduling standpoint, and, e.g., from a product-manufacturing standpoint, it would be not only economical but also desirable to be able to effect substantially simultaneous main-chain formation as well as side-chain formation of such a polymer, because the substantially simultaneous chain-formation mechanisms would enable utilization of a single reaction vessel.

It would further be desirable not only to produce such polymer products in a single reaction vessel but also to so produce such polymers without requiring the presence of a catalyst.

We have discovered that a graft polymer of this type—that is, a graft polymer comprising at least one polymeric main chain and a plurality of polymeric side chains attached to the main chain—can be produced in accordance with the principles of our novel process disclosed hereinbelow. One embodiment of such a process, for example, utilizes a single reaction vessel in which the graft polymer formation occurs. That is, the main chain and the side chains of the graft polymer are formed substantially simultaneously within the single reaction vessel.

We have also discovered that the principles of our particular invention can satisfactorily and effectively be practiced without the need for a catalyst. Indeed, no graft polymer herein disclosed was made in the presence of a catalyst.

SUMMARY OF THE INVENTION

We have further discovered that certain reactants (disclosed herein) are capable, under controlled conditions, of functioning as free-radical initiators. Thus, by our process, traditional free-radical initiators and/or catalysts, such as those disclosed, for example, in British Pat. No. 1,443,073 to Bayne et al., in U.S. Pat. No. 3,760,034 to Critchfield et al., in U.S. Pat. Nos. 3,892,714 and 4,005,155, both to Sampson et al., and in U.S. Pat. No. 4,082,816 to Fisk et al., are not required.

Accordingly, one aspect of our present invention is directed to a polymerization process for producing certain alkali-soluble so-called "graft" polymers, without the need of a traditional initiator and/or catalyst.

Another, more specific aspect or feature of our present invention is directed to a polymerization process (briefly mentioned above) which makes use of at least two different reaction mechanisms, that take place substantially simultaneously, to produce such graft polymers.

Such polymers, in accordance with the principles of the present invention, are characterized as graft polymers in that they have at least one main chain and a plurality of side chains attached to each such main chain.

Yet another aspect of the present invention is directed to the graft polymers, briefly characterized above, that are produced as a result of utilizing the novel process described herein. These polymers are further characterized as so-called "polyacid" polymers. Accordingly, these polymers are not only alkali-soluble but also are crosslinkable as well. Indeed, a variety of specific uses and/or applications for such polymers are disclosed hereinbelow.

In our process for producing such a graft polymer, we contemplate combining certain co-polymerizable reactants in a solvent contained within an agitated reaction zone. The co-polymerizable reactants comprise (1) at least one vinylic monomer that is capable of forming free radicals, (2) at least one ethylenically-unsaturated carboxylic acid monomer that is capable of addition-copolymerizing with the vinylic monomer in the presence of the thus-formed free radicals, and (3) cyclic ester molecules that are capable of ring-opening in the presence of the carboxylic acid monomer and of chemically bonding thereto. These co-polymerizable reactants are combined in the solvent to produce a polymerizable monomeric mixture.

The above-mentioned vinylic monomer, for purposes of the present invention, is able to generate free radicals under certain controlled conditions (which conditions are discussed in greater detail hereinbelow). The carboxylic acid monomer, for purposes of the present invention, is ethylenically unsaturated, contains at least one carboxylic acid group (or moiety), and is able to addition-copolymerize with the vinylic monomer in the presence of the above-mentioned thus-formed free radicals. The cyclic ester molecules, moreover, are able to ring-open at their respective inner ester bonds in the presence of the carboxylic acid moiety (or moieties) of the above-mentioned carboxylic acid monomer.

In our process, we then subject the monomeric mixture to a preselected temperature and pressure, effective to cause the vinylic monomer and the ethylenically-unsaturated carboxylic acid monomer to free-radically addition-copolymerize to form at least one main chain of the graft polymer. Such utilization of the ethylenically-unsaturated carboxylic acid monomer (to thus-form the main chain), moreover, results in the formation of a main chain having at least one, but generally a plurality of, carboxylic acid moieties chemically bonded thereto.

The above-mentioned preselected temperature and pressure is also effective to cause the cyclic ester molecules that are in the presence of the carboxylic acid moieties to ring-open at the respective inner ester bonds thereof and to graft onto the polymer main chain at respective ones of the plurality of carboxylic acid moieties, chemically bonding thereto, thereby forming the side chains of the graft polymer.

The process of the present invention is particularly characterized in that the main-chain and side-chain formations of the graft polymer occur substantially simultaneously, without utilizing a traditional initiator and/or catalyst.

DETAILED DESCRIPTION OF THE PREFERRED EMBODIMENT

While the present invention is susceptible to embodiment in various forms, there is hereinafter described in detail a number of examples embodying the principles of the present invention. The present disclosure, therefore, is to be considered as merely an exemplification of the present invention without limitation to the specific embodiments or examples presented and/or discussed hereinbelow.

In the ensuing detailed description, certain terms will be utilized for purposes of conciseness and otherwise to elucidate the features and advantages of the present invention. These terms are defined as follows.

The term "addition polymerization" as used herein in connection with the terms "addition-polymerizable monomer" and "addition polymerize", relates to certain polymer chain-forming reactions, wherein the agent or ingredient, that is utilized to effect formation of the polymer main chain and/or polymer side chain that is being formed, is an ionic species (or another suitably-reactive substance) having at least one unpaired electron that is able to function as a "free radical". A free radical is, broadly speaking, a species that is capable, for example, of reacting (1) to open the double-bond of an ethylenically-unsaturated monomer and (2) to attach itself to such monomer in the vicinity of the double-bond portion thereof. Such attachment causes a polymer chain to begin growing, leaving an unpaired electron which, in turn, can function as the next-to-form (or subsequent) free-radical species, to further propagate the chain. Typically, in a relatively short period of time (e.g., usually a few seconds or less), several monomeric units can successively add to the thus-growing chain (via the double bond-opening mechanism described immediately above). Finally, two of the hereinabove-described "free radical" species typically react with each other in a manner so as to terminate their mutual growth activity, thereby forming one or more polymer molecules. Thus, the term addition polymerization comprises discreet "initiation", "propagation", and "termination" steps.

The terms "carboxyl moiety", "carboxyl group", "carboxylic acid moiety", and "carboxylic acid group" as used herein refer to that functional group typically depicted as —COOH.

The term "coating", which includes the term "film", as used herein means a composition-of-matter, utilized to cover a surface or be spread over a substrate.

The term "cyclic ester" as used herein includes lactones, lactides, and like ringed structures having ester bonds in the ring portions thereof.

The terms "electrophile" and "nucleophile" as used herein are defined relative to acid-base reactions in relation to the manner in which each shares an electron. Specifically, a base donates an electron pair in covalent bonding and an acid accepts the electron pair. Such an electron-accepting acid is referred to as electrophile, whereas an electron-donating base is referred to as a nucleophile.

The term "elevated temperature" as used herein means any temperature above room temperature.

The term "film" as used herein means a relatively fine, thin-skin or coating.

The term "free radical", broadly mentioned above, is further understood to include certain addition (or ionic) polymerization-inducing moieties, sometimes also called "initiators", which can at times be formed spontaneously, or which can be formed by the thermally-induced decomposition of a relatively unstable substance.

The term "ionic polymerization" as used herein typically involves the transfer of an ion, an ionic species, or an electron, to (or from) a monomer or a monomeric species, resulting in the formation of a so-called "ion pair". Such ion pair-formation typically arises during the initiation step of an ionic polymerization reaction. It is currently postulated that the counter-ion of such an ion pair remains in the immediate vicinity of the growing-polymer chain-end throughout the lifetime thereof (i.e., during the propagation of the thus-growing polymer chain). Ionic polymerization (similar to addition polymerization, mentioned above) thus also comprises discrete initiation, propagation, and termination steps.

The term "main-chain polymerization" as used herein means initiation, propagation and termination of the main chain of a particular graft polymer. The monomeric units forming the main chain are typically added together in a random order, if differing monomeric species are present, via certain ionic and addition-polymerization mechanism discussed herein.

The term "monomer" as used herein means those particular polymerizable starting materials, including polymerizable molecules, from which a polymeric product is formed. The term "monomer" as used herein further includes "oligomers" as well as certain other polymers that are further polymerizable.

The term "Mz" is the molecular weight measure (for polymers), known as the so-called "sedimentation average molecular weight", as defined in U.S. Pat. No. 4,529,787 to Schmidt et al. (assigned to S. C. Johnson & Son, Inc., Racine, Wisconsin), which term is hereby incorporated by reference.

The term "oligomer" as used herein means a polymer molecule which oftentimes consists of only a relatively few number of monomeric units, yet is nevertheless further polymerizable. In particular, the term "oligomer" as used herein generally denotes a relatively short-chain polymerizable molecule comprising only about 2 to about 30 monomeric units.

The term "polydispersity" as used herein means the ratio of the weight-average molecular weight (Mw) to the number-average molecular weight (Mn), i.e. Mw/Mn. A related term, used herein for further characterizing the polydispersity of a polymer, is the ratio of the sedimentation-average molecular weight to the number-average molecular weight, i.e., Mz/Mn. The terms Mw/Mn and Mz/Mn are, in particular, herein used as a measure of the breadth of the molecular weight distribution of the graft polymer that is produced via the present process.

The term "polymer" as used herein is broadly used in reference to a macromolecule formed by the chemical union of monomeric units. For example, when two or more monomeric units are so utilized, the macromolecule that is formed as a result may, more particularly, be broadly referred to as a copolymer (if two or more monomeric units are utilized), or may, more particularly, be referred to as a terpolymer (if three distinct monomeric units are utilized), a tetrapolymer (if four distinct monomeric units are utilized), etc. Typically, the macromolecule that is described herein includes at least one main chain, and further includes a plurality of side chains attached to the main chain. Crosslinking, moreover, as between the several different types of chains may be possible in a variety of ways.

The term "room temperature" as used herein means about 25° C. (i.e., about 77° F.).

The term "SGA polymerization" as used herein means the substantially simultaneous graft/addition polymerization process disclosed herein. Briefly, SGA polymerization as herein defined means substantially simultaneous main-chain and side-chain graft-polymer formation. In particular, as the graft polymer main chain propagates, portions of the main chain (that have nucleophilic moieties such as the carboxylic acid moieties mentioned above) cause the ring-openable cyclic ester molecules in the vicinity thereof to open at the inner ester linkages thereof and to graft onto at least some of these carboxylic acid moieties. More particularly, when the nucleophilic moiety is a carboxylic acid moiety and when the ring-openable cyclic ester molecule is, for example, a lactone such as epsilon-caprolactone (CAP), the presence of the main-chain carboxylic acid moiety causes the ring-portion (of the CAP molecule) to open at the inner ester bond thereof and to graft onto the thus-propagating main chain of the polymer, thereby forming a polyester (specifically, a CAP-based) side chain having a terminal carboxylic acid group. Accordingly, portions of the main chain, as well as the terminal end of the polyester side chain, each have a carboxylic acid moiety.

Additional CAP monomer, in accordance with the principles of the present invention, may therefore graft onto the growing main chain or may further propagate the CAP-based side chain of the graft polymer.

The term "side-chain polymerization" as used herein means the initiation, propagation and termination of a side chain of the graft polymer (from the main chain thereof).

The term "thermoset" polymer coating or film as used herein means a polymer coating or film that solidifies or otherwise "sets", irreversibly, upon heating. This property is usually associated with a crosslinking reaction of certain molecular constituents of the polymer, such crosslinking reaction being induced, for example, by heat, radiation, or by other means. In many instances, it is necessary to add to the polymer a "curing" agent, such as an organic peroxide, to effect thermosetting.

The graft polymer made by the process of the present invention is broadly characterized as a "polyacid" because of the presence of terminal carboxylic acid groups on each of the side chains thereof. Thus, in addition to being soluble in many common organic solvents, the graft polymer that is produced in accordance with the process disclosed herein—because of these acid groups—is, therefore, also soluble in aqueous alkali solutions.

One aspect of the present invention, briefly mentioned above, is directed to a novel polymerization process for producing certain alkali-soluble graft polymers without the need of a traditional initiator and/or catalyst.

As briefly mentioned above, we have discovered that our particular process can satisfactorily and effectively proceed in a rapid manner without the need for a catalyst. Such a discovery surprised us because our review of the pertinent literature indicated ring-opening of certain lactones onto carboxylic acid-containing main-chain polymers proceeds either very slowly or to a negligible degree, if such grafting is attempted without utilization of a catalyst. [See, e.g., an article by Shiota et al., published in the Journal of Applied Polymer Science, Vol. 11, at pages 783 and 786 (1967).]

Yet another surprising aspect of the present invention is that certain polymers, produced in accordance with the principles disclosed herein, exhibit crystallinity, while certain others do not. The degree or amount of crystallinity exhibited was indeed surprising to us, particularly in view of references noting that poly-epsilon-caprolactone is merely a "partially" crystalline polymer. [See, e.g., an article by Brode et al., titled "Lactone Polymerization and Polymer Properties", published in J. Macromol. Sci.-Chem., A6(6), at page 1119 (1972).]

We have found that the presence of (or lack of) crystallinity is dependent upon the relative ratios of the monomers utilized to produce the polymer. Such a finding is presented hereinbelow in connection with certain enumerated examples.

The presence of, or the lack of, crystallinity in a polymer can, moreover, be verified by the presence, or the lack, of a melting point (Tm), respectively. The Tm can, for example, be exhibited during a thermal scan of the polymer.

The presence of crystallinity in a graft polymer can be highly desirable for a number of reasons. First, crystallinity may impart toughness to the polymer. Second, crystallinity may also provide the polymer with solvent-and-abrasion resistance.

Accordingly, yet another aspect of the present invention is directed to the degree of crystallinity of the polymer thus produced.

A further aspect of the present invention is the method by which the graft polymer is produced. In the production of a conventional graft polymer, the main chain and the side chains are typically formed at different times via separate reaction mechanisms. Oftentimes separate reaction equipment is utilized to produce such a conventional graft polymer. U.S. Pat. Nos. 3,892,714 and 4,005,155, both to Sampson et al., as well as U.S. Pat. No. 3,760,034 to Critchfield et al., for example, all disclose processes that are fairly typical of such a reaction scheme.

In contradistinction, the process of the present invention utilizes at least two different reaction mechanisms, which take place substantially simultaneously, to produce the graft polymer.

Such graft polymers can be formulated, for example, into thermoset coatings and films. Other applications of the alkali-soluble graft polymer of the present invention include, but are not limited to, alkali-soluble coatings (such as alkali-soluble floor finishes), alkali-soluble resins for graphic-arts formulations, alkali-soluble support resins for polymers prepared, for example, via emulsion-polymerization processes, and the like.

Other applications include use in connection with (i.e., inclusion in) certain hair-spray formulations, shampoos, and other types of cosmetic products. For example, certain versions of the graft polymer disclosed herein can be included in an alcohol-containing shampoo formulation, and can later be rinsed out of the hair utilizing an alkali-containing conditioner.

Graft polymers made in accordance with the principles disclosed herein are also characterized as so-called "high solids", "low molecular weight" polymers that exhibit low viscosity. Such polymers, in addition to what was briefly mentioned above, are therefore suitable for certain specific uses in connection with so-called "industrial" fluids such as plasticizers, lubricants, and the like.

Accordingly, certain specific applications for the types of high-solids coatings that can be formulated utilizing the graft polymer of this invention include, but are not limited to, coatings and finishes for cans, coils, fabrics, vinyls, papers, furniture, magnetic wire, appliances, metal parts, wood panels, and floors. Other typical applications for such high-solids polymers (or resins) are in paints, inks and adhesives, as well as tackifiers, dispersants, and the like. The high-solids polymers or resins can be recovered as liquids or solids, depending on the Tg thereof.

Because these resins contain carboxylic acid groups, they can be chemically converted, for example, into an aqueous resin cut, by neutralization of the acid functionality with a base such as ammonia.

Further, the high-solids crosslinkable polymers disclosed herein have many other applications as well. They are, for example, readily formulated into enamel appliance coatings, overprint varnishes, adhesives, and motor-vehicle exterior surface coatings, as well as airplane and boat exterior surfaces, finishes, coatings, and the like.

Still further, because the crosslinkable polymers disclosed herein can be controllably crosslinked so as to be either "hard" or "soft", as desired, such polymers can readily be formulated into floor finishes, ink dispersants, water-based clear overprint varnishes, impregnants, binders; plasticizers, leveling agents, melt flow improvers, and the like. For example, certain so-called "softer" resins can be utilized as functional fluids, oils, and the like.

As mentioned above, the process of the present invention can be selectably controlled so as to produce graft polymers having predetermined, desirable physical properties. One such specially-manufactured graft polymer can be utilized, for example, in connection with so-called "essentially solvent-free" coatings systems. In particular, coating systems of this sort, having usable viscosities at room temperature, can readily be formulated. Such solvent-free coatings systems are, for example, applicable in conventional industrial coating processes, including hot-spraying, roll-coating, and the like.

In the alternative, and if desired, certain conditions of the process disclosed herein can be changed so that the polymers prepared via the process of the present invention can be formulated into solvent-based coatings systems. Such solvent-based coatings systems, moreover, can readily be formulated utilizing, for example, suitable solvents, fillers, pigments, flow-control agents, and the like. Such coatings can be applied, with the addition of conventional adjuvants, to cans, coils, fabrics, vinyl, paper, metal, furniture, wire, other metal parts, wood paneling, and the like.

Still further, the alkali-soluble resins disclosed herein can be formulated into desired resin cuts, utilizing commercially-available aqueous bases, to provide exceptional leveling and/or detergent-resistant properties, including improved adhesion, when incorporated into a floor-polish composition along with certain other ingredients. Such other ingredients can include, for example, suitable metalized acrylics, methacrylic or copolymer emulsions, certain wax emulsions, including adjuvants such as plasticizers, surfactants, anti-foaming agents (included within, for example, certain organic solvents and/or organic bases), and the like. In particular, the wax-based formulations yield exceptional gloss, color-free finishes, and are highly resistant to yellowing and detergent action. Moreover, inks having excellent adhesion properties can be formulated, utilizing the polymers disclosed herein as binding agents.

Such a polymer is made by a novel process, briefly described as follows. The process of the present invention contemplates combining, in a solvent contained within an agitated reaction zone, (1) at least one vinylic monomer that is capable of forming free radicals, (2) at least one ethylenically-unsaturated carboxylic acid monomer that is capable of addition-copolymerizing with the vinylic monomer in the presence of the thus-formed free radicals, and (3) cyclic-ester molecules that are capable of ring-opening in the presence of the carboxylic acid monomer and of chemically bonding thereto, thereby producing a copolymerizable monomeric reaction mixture.

The cyclic ester molecules each have at least one ring-openable inner ester bond. An inner ester bond as herein defined is a particular bond in the cyclic ester structure itself, as opposed to an ester bond that might be present in a side chain-attached moiety.

The process of the present invention further contemplates subjecting the copolymerizable reaction mixture to a preselected temperature and pressure, effective to cause the free radical-forming vinylic monomer and the ethylenically-unsaturated carboxylic acid monomer to free-radically addition-copolymerize. Such free-radical addition-copolymerization forms at least one of the main chains of the graft polymer. Because the ethylenically-unsaturated carboxylic acid monomer is used to form the graft polymer main chain, as outlined above, a plurality of carboxylic acid moieties are thus generally included in the structure of, and accordingly are chemically bonded, to the main chain of the graft polymer. The polymerization temperature and pressure is also effective to cause the cyclic-ester molecules to each ring-open at the respective inner ester bonds thereof and to graft onto the polymer main chain at respective ones of the plurality of carboxylic acid moieties, thereby forming the side chains of the graft polymer.

As used herein, the terms "traditional initiator" and "traditional catalyst" are defined as follows.

The "traditional initiator", mentioned above, is an ingredient or other agent that is added to a polymerizable monomer, or a polymerizable mixture of monomers, for the purpose of starting (i.e. "initiating") polymerization of the single polymerizable monomer or at least one of the polymerizable monomers of the mixture. A traditional initiator is not, however, one of the polymerizable monomers (or like polymerizable ingredient) that is utilized as a reactant. That is, a traditional initiator is typically chosen so as to "initiate" a particular polymerization reaction.

Although many traditional initiators are consumed, at least to some degree, during the desired polymerization reaction, such consumption of initiator is generally undesirable. In particular, the unconsumed portions of such initiators can—and under certain operating conditions oftentimes do—undesirably interfere with desired, on-going polymerization reactions.

The "traditional catalyst", mentioned above, undergoes no chemical change—theoretically at least—during the course of a particular chemical reaction. The purpose of such a catalyst is to change the rate of reaction. Most catalysts are specifically designed to accelerate the rate of a desired chemical reaction; a few are specifically designed to retard the rate. Many catalysts, however, cannot be used indefinitely. That is, catalysts are oftentimes undesirably altered (i.e. become "fouled") by certain reaction by-products and must be replaced and/or regenerated from time to time.

Many initiators—and, more particularly, most catalysts—are relatively specific in nature. That is, these agents are added to a monomer or to a monomer mixture for the purpose of desirably effecting a particular reaction mechanism. Yet the presence of such an agent or agents, while necessary to desirably bring about one such desired result, can undesirably effect a second reaction mechanism. Indeed, in the formation of a graft polymer, conventional manufacturing processes are utilized so as to initially cause main-chain formation to occur in the presence of one such traditional initiator and/or catalyst. Thereafter, the thus-formed main chain is separated from the initially-utilized traditional initiator and/or catalyst. Subsequently, side-chain formation is then caused to occur in the presence of yet another traditional initiator and/or catalyst. Example 1 of U.S. Pat. No. 3,760,034 to Critchfield demonstrates one such conventional reaction scheme.

In contradistinction, the process of the present invention utilizes one of its monomeric reactants, namely, the above-described vinylic monomer ingredient, as a free-radical initiator. In particular, the vinylic monomer of the present invention is specifically chosen so as to be able to generate particular free radicals which, in turn, are able to cause the ethylenically-unsaturated carboxylic acid monomer to addition-copolymerize with the vinylic monomer, in the presence of such free radicals. Accordingly, subjecting the polymerizable monomeric mixture to a predetermined temperature and pressure causes the vinylic monomer and the ethylenically-unsaturated carboxylic acid monomer to free-radically addition-copolymerize to form the graft polymer main chain. Thus the vinylic monomer is not only an addition-copolymerization free-radical initiator, it is also one of the addition-copolymerization reactants as well. The vinylic monomer accordingly functions as a free radical-initiating, addition-copolymerizable reactant.

Accordingly, in the process disclosed herein, because certain ones of the reactants themselves are utilized to initiate polymerization, we characterize our process as a "reactant-initiated" polymerization process. Numerous benefits arise as a result of utilizing our process. For example, because we are dealing with reactants, as opposed to agents which could function as impurities, the likelihood of the production of undesired by-products or of the causation of undesired side reactions, which can result for example in attendant or subsequent hydrolytic and/or thermal instability, is greatly diminished. Furthermore, we were surprised to discover that at least two reaction mechanisms could be caused to take place substantially simultaneously, thereby enabling the graft polymer to be formed in a single reaction vessel. Single vessel graft polymer formation greatly simplifies the graft polymer manufacturing scheme which, in turn, can provide substantial manufacturing advantages such as economies in manpower and capital investment.

Still further, certain ones of the several below-presented examples demonstrate that the length of the side chains of the graft polymer of the present invention can readily be controlled by selectably modulating certain variables, such as the stoichiometry of the graft polymerization reaction mixture, while certain other variables are held constant.

In general, a carboxylic acid group is not considered a very good nucleophile; and, therefore, prior-art researchers have historically presumed that a traditional initiator and/or catalyst must be utilized to effect ring-opening and subsequent grafting of the cyclic ester onto such carboxylic acid groups. This is well documented in the art. See, for example, U.S. Pat. No. 4,082,816 to Fisk et al., as well as U.S. Pat. No. 3,760,034 to Critchfield, and U.S. Pat. Nos. 3,892,714 and 4,005,155, both to Sampson et al.

It was surprising to us, therefore, to discover that ring-opening and subsequent grafting of the cyclic ester onto a carboxylic acid group could be effected without utilizing a traditional initiator and/or catalyst.

The solvent that is utilized to achieve the SGA polymerization reactions disclosed herein should not contain carboxylic acid groups, or other nucleophilic or electrophilic groups, as such would tend to compete with any carboxylic acid moiety-containing ethylenically-unsaturated monomer that may be present. The presence of such would result in undesirable ring-opening of the cyclic ester molecules.

Still further, as a practical matter, and because solvents that are utilized in accordance with the principles of the present invention are generally all relatively volatile, to varying degree, a suitable solvent having a sufficiently high boiling point is typically chosen such that the solvent vapor does not overpressurize the particular polymerization reactor utilized (to effect desired SGA polymerization).

Illustrative of the various kinds of solvents that can be utilized in the process of the present invention are those that are well known in the art, such as, cyclohexanone, toluene, methyl isobutyl ketone (MIBK), tetrahydrofuran, acetone, 1,3-dioxane, 1,4-dioxane, ethyl acetate, hexane, ethyl benzene (ETB), diethyl carbitol, dimethyl carbitol, diethyl cellosolve, cellosolve acetate (CSA), glyme, diglyme, triglyme, methyl amyl ketone (MAK), ethoxy ethyl acetate, xylene, methyl ethyl ketone (MEK), propylene glycol monomethyl ether acetate (PM acetate), ethoxy ethyl acetate, and the like, and mixtures thereof.

The higher-boiling solvents are preferred due to their relatively lower vapor pressures at high temperatures. In general, solvents having boiling point temperatures above about 100° C. are preferred, with those solvents having boiling points above about 135° C. being more preferred. More preferably, the solvent has a boiling point of about 135° to about 200° C.

The preferred solvents include methyl amyl ketone, xylene, PM acetate, toluene, cellosolve acetate, ethoxy ethyl acetate, ethyl benzene, diethyl cellosolve, and mixtures thereof. The more preferred solvents include methyl amyl ketone, xylene, cellosolve acetate, and PM acetate, and mixtures thereof.

Suitable vinylic monomers, able to generate free radicals in accordance with the principles of the present invention, include certain alkenyl monomers such as 1,3-butadiene, 1,3,5-hexatriene, and the like, and combinations thereof, as well as certain aromatic monoalkenyl monomers such as styrene, alpha-methyl styrene (AMS), vinyl toluene (VT), tertiary-butyl styrene (TBS), ortho-chlorostyrene (OCS), and the like, and combinations thereof. Such alkenyl monomers and aromatic monoalkenyl monomers are capable of forming unstable, so-called "Diels-Alder" adducts, and are thus able to function as free-radical generators in accordance with the principles of the present invention.

Preferred vinylic monomers that are able to generate free radicals include vinyl toluene, alpha-methyl styrene, tertiary-butyl styrene, ortho-chlorostyrene, styrene, and mixtures thereof.

Illustrative of cyclic ester molecules that have at least one ring-openable inner ester bond, for purposes of the present invention, include epsilon-caprolactone (herein referred to as CAP), zeta-enantholactone, delta-valerolactone, as well as certain alkyl-epsilon-caprolactones, and the like, as well as combinations of the above.

Additional suitable cyclic ester molecules for purposes of the present invention include gamma-butyrolactone, gamma-valerolactone, ethylene carbonate, tetramethylene carbonate, 2,2-dimethyl-4-phenyl-1,3-dioxolan-5-one, alpha-n-propyl-delta-valerolactone, delta,delta-dimethyl-delta-valerolactone, 3-ethyl-1,4-dioxan-2-one, 3,3,6-trimethyl-1,4-dioxane-2-one, tetramethyl glycolide, tetraphenyl glycolide, 3-oxa-epsilon-caprolactone, beta-propiolactone, alpha,alpha-bis(chloromethyl)propiolactone, beta-butyrolactone, pivalolactone (PVL), thio-butyrolactone (TBL), delta-valerolactone (DVL), alpha,beta,gamma-trimethoxydelta-valerolactone, 1,4-dioxane-2-one, glycolide, lactide, 1,4-dithiane-2,5-dione, trimethylene carbonate, neopentyl carbonate, ethylene oxalate, beta-methyl-epsilon-isopropyl-epsilon-caprolactone, propylene oxalate, lactones of 4-hydroxycyclohexanecarboxylic acid, cis-disalicylide, di-o-cresotide, and trisalicylide, as well as combinations of the above.

Preferred cyclic ester molecules having at least one ring-openable inner ester bond include gamma-butyrolactone, delta-valerolactone, pivalolactone, thio-butyrolactone, beta-butyrolactone, epsilon-caprolactone, and mixtures thereof.

Illustrative of various ethylenically-unsaturated carboxylic acid monomers that are able to addition-copolymerize with the vinylic monomer, in the presence of the free radicals generated thereby, and that are able to cause cyclic ester molecules to ring-open at the inner ester bond portions thereof, in accordance with the principles of the present invention, are acrylic acid (AA), methacrylic acid (MAA), fumaric acid, crotonic acid, itaconic acid, maleic acid, cinnamic acid, 2,3-bis-(para-methoxyphenyl)-acrylic acid, meta-phenylene diacrylic acid, oleic acid, and the like, and combinations thereof.

Preferred ethylenically-unsaturated carboxylic acid monomers include maleic acid, itaconic acid, crotonic acid, acrylic acid, methacrylic acid, and mixtures thereof.

The more-preferred ethylenically-unsaturated carboxylic acid monomers are acrylic acid, methacrylic acid, and mixtures thereof.

Generally, a suitable polymerization temperature, for purposes of the present invention, is about 160°–300° C.; preferably, the polymerization temperature is about 200°–240° C.

Suitable reaction pressures include ambient pressure (about 14.7 psia) up to about 2,000 psia; preferably the reaction pressure is ambient pressure to about 300 psia.

While not wanting to be tied to theory, yet desirous of providing a complete disclosure, it is presently believed that main-chain polymerization, in accordance with one of the principles of the present invention, proceeds in a self-initiated manner when a free radical-generating vinylic monomer ingredient—such as styrene, for example—is used as the above-discussed vinylic monomer reactant that is addition-copolymerizable with the above-discussed ethylenically-unsaturated carboxylic acid monomer reactant. It is therefore postulated that 4 molecules of the free radical-generating reactant (e.g. styrene monomer) react spontaneously at suitable elevated temperature to produce 2 molecules of an unstable Diels-Alder adduct, such as is depicted in Equation 1 below.

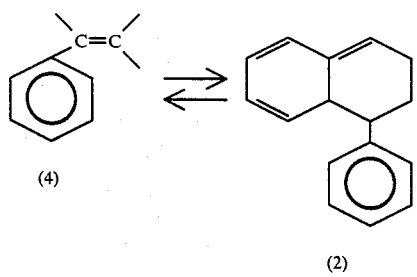

(Eq. 1)

Moreover, as is also shown in Equation 1, the free radical-generating reactant (e.g. the styrene monomer) as well as its unstable Diels-Alder adduct are believed to co-exist as a mixture in a state of equilibrium, depending at least in part upon the temperature to which these ingredients are subjected. Raising the temperature of the equilibrium mixture above room temperature to an elevated temperature is thus believed to convert 2 molecules of the unstable Diels-Alder adduct, via molecule-induced homolysis, into monoradicals that are capable of initiating polymerization, as depicted in Equation 2 below.

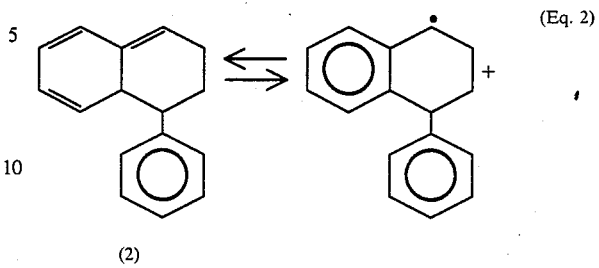

(Eq. 2)

The symbol R° is hereinafter used to refer to either one, or both, of the two above-depicted chemical structures (shown on the right-hand side of the chemical-equilibrium arrows depicted in Equation 2). That is, such chemical structures include the free radical-containing carbon atoms. Such monoradicals are hereinafter simply referred to by the symbol R°.

Meanwhile, the combining of (1) whatever residual vinylic monomer (i.e. styrene monomer) that is present with (2) the ethylenically-unsaturated carboxylic acid monomer, in the presence of these free radicals, R°, is believed to result in the main-chain growth of the graft polymer, as is depicted in Equation 3 below.

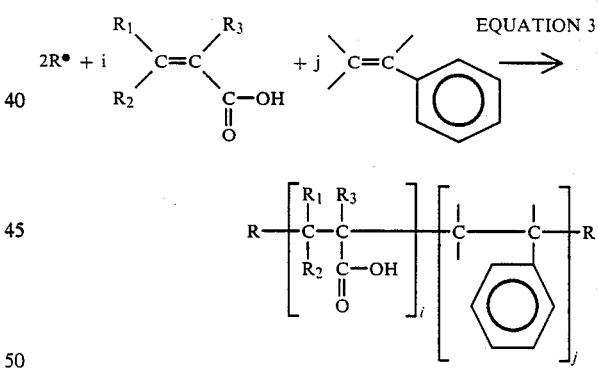

EQUATION 3 where $R_1$ and $R_2$ are —H, —CH$_3$ or —COOH, where $R_3$ is —H, —CH$_3$, —COOH, —CH$_2$COOH,

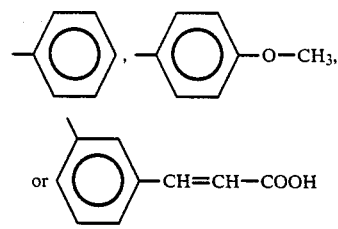

and where i and j are each about 1 to about 500.

That is, the main chain of the illustrative reaction product shown in Equation 3 comprises random sequences of vinylic (e.g. styrenic) monomeric units and ethylenically-unsaturated carboxylic acid monomeric units throughout. At the end portions of the main chain are the above-mentioned free-radical initiator species having monomeric units that are derived from the illustrative vinylic monomer, namely styrene (i.e., the unstable Diels-Alder molecule-inducted homolysis product mentioned above).

The side chains are belived to propagate by a mechanism shown, for example, in Equation 4. Side-chain propagation, moreover, appears to be substantially simultaneous relative to the main-chain formation mechanisms, depicted in Equations 1–3. The result is that cyclic ester molecules appear to be reacting with the ethylenically-unsaturated carboxylic acid monomer while main-chain formation is occurring. In particular, at the elevated temperature mentioned above, the cyclic ester molecules—such as the above-mentioned, illustrative lactone, specifically caprolactone (CAP)—have a ringed portion that opens at the inner ester bond thereof in the presence of the carboxylic acid moieties of the ethylenically-unsaturated carboxylic acid monomer, as is depicted below in Equation 4. Such a reaction mechanism is believed to result in the side-chain formation of the graft polymer.

EQUATION 4

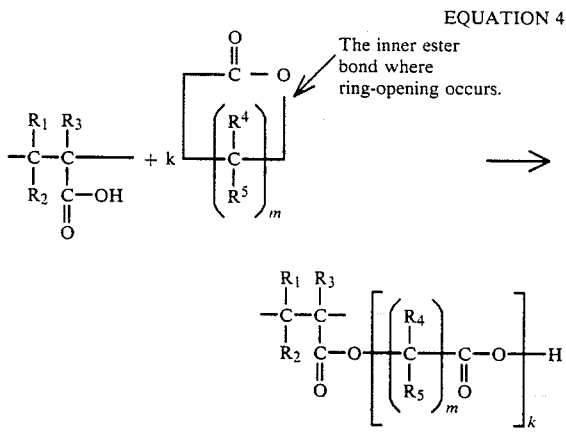

where $R_4$ and $R_5$ are —H or —CH$_3$, and where k is 0 to 50, and m is 2 to 11.

Thus, one embodiment of our novel graft polymer is believed to possess the following structure:

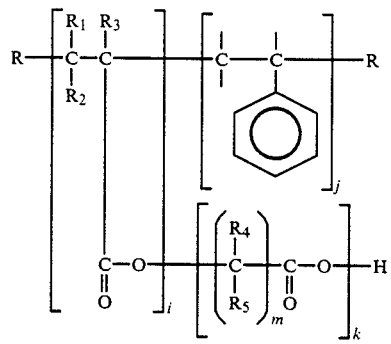

where $R_1$, $R_2$, $R_3$, $R_4$, $R_5$, i, j, k, and m are defined above in connection with Equations 3 and 4, and where R is an end-cap which is based upon an unstable Diels-Alder adduct that is derived from the group consisting of vinyl toluene, alpha-methyl styrene, tertiary-butyl styrene, ortho-chlorostyrene, styrene, and mixtures thereof.

Preferably, these reactions (e.g., Equations 3 and 4), are controllably terminated when the above-presented, desired alkali-soluble graft polymer attains, for example, a preselected polydispersity value, a preselected viscosity value, a preselected sedimentation-average molecular weight value, a preselected melt temperature (Tm) value, and/or a preselected glass-transition temperature (Tg) value.

As was mentioned above, the novel process disclosed herein comprises combining (1) at least one vinylic monomer that is capable of forming free radicals, (2) at least one ethylenically-unsaturated carboxylic acid monomer that is capable of addition-copolymerizing with the vinylic monomer in the presence of the thus-formed free radicals, and (3) cyclic-ester molecules that are capable of ring-opening in the presence of the carboxylic acid monomer and of chemically bonding thereto.

This "combining" step preferably takes place in the liquid phase in, for example, a suitable reaction vessel, utilizing agitation. For example, illustrative reaction vessels include agitated batch-type reactors, continuous flow stirred tank reactors (so-called "CSTRs"), plug-flow type (so-called "tubular") reactors, as well as static mixers, in-line dynamic mixers, extruders, and the like.

Yet another aspect or feature of the present invention is that the solvent (without the above-described monomers and cyclic ester molecules) can be preheated to the desired temperature; and thereafter, the above-described monomers and cyclic ester molecules can be admixed together and thereafter poured into the solvent or simply combined therewith. An alternative variation of this aspect of the present invention is to heat the solvent (already containing the thus-admixed or thus-combined monomers and cyclic ester molecules) from a lower temperature to the desired reaction temperature.

The polymerization process of the present invention is particularly characterized in that each of the polymer main-chain and side-chain propagation steps discussed above occurs substantially simultaneously, relative to the other, and is even further characterized in that each polymer propagation step occurs without utilizing a traditional initiator and/or catalyst.

The alkali-soluble graft polymer produced by the above-described process, technically referred to as a "polyacid" (because it is a polymer containing a plurality of "active" carboxylic acid sites or moieties), preferably has a number-average molecular weight of about 500 to about 30,000; more preferably has a number-average molecular weight of about 750 to about 20,000; and most preferably has a number-average molecular weight of about 1,000 to about 10,000.

Upon termination of the polymer-chain propagation steps, the polyacid polymer of the present invention is separated from its reaction solvent by conventional means.

Reaction time of the above-presented reaction mechanisms varies widely, depending upon, for example, the types and relative amounts of vinylic monomers, ethylenically-unsaturated carboxylic acid monomers, cyclic ester molecules, solvent, reaction temperature, desired molecular weight, and reactor design (including recycle and/or degree of agitation). Reaction time, accordingly, can be anywhere from a few seconds or minutes to several hours or more.

The alkali-soluble graft polymers of this invention can be either solids or liquids at room temperature. Such graft polymers have solution viscosities of from about 50 cP to about 1000 cP, measured at a concentration of about 50 wt.-%.

The following examples are set forth to illustrate more clearly, to one skilled in the art, the principles and practice of this invention. As such, they are not intended to limit the scope of the present invention; but rather, are merely illustrative of certain aspects of the various preferred embodiments. In these examples, the molecular weight of the polyacid polymer product was determined by gel permeation chromatography (GPC), using: a Waters 150C chromatograph at 35° C., a total of five so-called "micro" sized (i.e., $1\times10^{-6}$ meters) Styragel columns (i.e., $1\times10^5$, $1\times10^4$, $1\times10^3$, 500, and 100 Angstroms, pore sizes), and tetrahydrofuran as the solvent. The flow rate was one milliliter per minute; and 200 microliters of a 0.2 weight-percent solution was injected.

Thermal analyses were performed using a Du Pont instrument 1090B/910 differential scanning calorimeter (DSC). The glass-transition temperature (Tg) was deemed to be the temperature at the mid-point of the overall change in heat capacity associated with Tg. As was mentioned above, certain ones of the graft polymer products made in accordance with the principles of the present invention were found to be crystalline, while other ones were found to be amorphous. As to the crysalline polymer products, the melting point (Tm) was deemed to be that temperature where the onset of the overall change in heat capacity from the solid to the liquid phase occurred. The amorphous polymer products do not exhibit a Tm.

BEST MODE

The following examples present the best mode, contemplated by the inventors, for disclosing the various principles as well as other aspects, features, and applications of the present invention.

EXAMPLE 1

One Method of Making the Polymer

A monomer mixture, comprising 18.8 grams of styrene, 18.8 grams of acrylic acid and 37.5 grams of caprolactone, was added to 25 grams of PM acetate solvent, thereby producing a solution.

Approximately 3 grams of the PM acetate solution was introduced into each one of several open glass ampoules capable of sustaining relatively high pressure. Each of the solution-containing ampoules was thereafter frozen, utilizing liquid nitrogen ($N_2$); evacuated; brought back to room temperature; and then purged with $N_2$ gas. This procedure was repeated three times before sealing each ampoule.

The sealed, solution-containing glass ampoules were then immersed in a conventional silicone-oil bath heated to 220° C., whereupon solution-polymerization of the monomer-mixture ingredients took place in the glass ampoules. During the course of the polymerization reaction, the oil bath-immersed, sealed, ampoule-contained samples were removed from the silicone-oil bath, at time intervals of 5, 15, 30, 60, 120 and 180 minutes (after being thus-immersed), for analyses by gas chromatography (GC) and gel-permeation chromatography (GPC).

The weight percent-conversion of monomer to polymer together with the weight-average molecular weight (Mw) of the polymer (as determined by GC and GPC), as a function of reaction time, are summarized as follows:

TABLE I

| MONOMER CONVERSION RATES | | | | |
|---|---|---|---|---|
| Reaction Time, | | % Conversion of Monomer to Polymer, based upon: | | |
| Minutes | Mw | Styrene | Acrylic Acid | Caprolactone |
| 5 | 8940 | 94 | 84 | 97 |
| 15 | 8230 | 98 | 92 | 99 |
| 30 | 8010 | 98 | 93 | 99 |
| 60 | 6440 | 99 | 99 | 99 |
| 120 | 6230 | 99 | 99 | 99 |
| 180 | 6580 | 99 | 99 | 99 |

Additional GPC analyses of the 180-minute reaction-time samples further disclosed a number-average molecular weight (Mn) of 1440, a sedimentation-value molecular weight (Mz) of 31080, and polydispersity ratios of Mw/Mn=4.6 and Mz/Mn=21.6.

EXAMPLE 2

Another Method of Making the Polymer

The procedures of EXAMPLE 1 were substantially repeated, except that the polymerization reaction temperature was 200° C. (instead of 220° C.); and the analytical results can be summarized as follows:

TABLE II

| MONOMER CONVERSION RATES | | | | |
|---|---|---|---|---|
| Reaction Time, | | % Conversion of Monomer to Polymer, based upon: | | |
| Minutes | Mw | Styrene | Acrylic Acid | Caprolactone |
| 5 | 10160 | 68 | 52 | 73 |
| 15 | 13610 | 90 | 76 | 96 |
| 30 | 14070 | 95 | 83 | 99 |
| 45 | 19180 | 97 | 88 | 99 |
| 60 | 14620 | 98 | 88 | 99 |
| 120 | 11530 | 99 | 93 | 99 |

Additional GPC analyses of the 120-minute reaction-time samples further disclosed a Mn of 2410, a Mz of 40900, and polydispersity ratios of Mw/Mn=4.8 and Mz/Mn=17.0.

EXAMPLE 3

Yet Another Method of Making the Polymer

The procedures of EXAMPLE 1 were substantially repeated, except that the polymerization reaction temperature was 180° C. (instead of 220° C.); and the analytical results can be summarized as follows:

TABLE III

| MONOMER CONVERSION RATES | | | | |
|---|---|---|---|---|
| Reaction Time, | | % Conversion of Monomer to Polymer, based upon: | | |
| Minutes | Mw | Styrene | Acrylic Acid | Caprolactone |
| 5 | 15750 | 47 | 20 | 44 |
| 15 | 15000 | 82 | 64 | 78 |
| 30 | 19810 | 93 | 80 | 95 |
| 45 | 21060 | 94 | 81 | 96 |
| 60 | 20410 | 97 | 85 | 99 |
| 120 | 20080 | 99 | 89 | 99 |

Additional GPC analyses of the 120-minute reaction-time samples further disclosed a Mn of 3210, a Mz of 57650, and polydispersity ratios of Mw/Mn=6.3 and Mz/Mn=18.0.

EXAMPLE 4

Still Another Method of Making the Polymer

The procedures of EXAMPLE 1 were substantially repeated, except that the polymerization reaction temperature was 160° C. (instead of 220° C.); and the analytical results can be summarized as follows:

TABLE IV

MONOMER CONVERSION RATES

| Reaction Time, | | % Conversion of Monomer to Polymer, based upon: | | |
|---|---|---|---|---|
| Minutes | Mw | Styrene | Acrylic Acid | Caprolactone |
| 5 | 20650 | 25 | 25 | 25 |
| 15 | 26350 | 51 | 47 | 36 |
| 30 | 28290 | 69 | 47 | 52 |
| 45 | 29980 | 81 | 59 | 75 |
| 60 | 32890 | 87 | 70 | 84 |
| 120 | 40440 | 94 | 91 | 97 |

Additional GPC analyses of the 120-minute reaction-time samples further disclosed a Mn of 5650, a Mz of 96450, and polydispersity ratios of Mw/Mn=7.2 and Mz/Mn=17.1.

EXAMPLE 5

Yet Another Method of Making the Polymer

The procedures of EXAMPLE 1 were substantially repeated, except that the polymerization reaction temperature was 260° C. (instead of 220° C.); and the analytical results can be summarized as follows:

TABLE V

MONOMER CONVERSION RATES

| Reaction Time, | | % Conversion of Monomer to Polymer, based upon: | | |
|---|---|---|---|---|
| Minutes | Mw | Styrene | Acrylic Acid | Caprolactone |
| 30 | 6020 | 98 | 96 | 98 |
| 60 | 5550 | 99 | 98 | 98 |
| 90 | 5530 | 99 | 99 | 98 |
| 150 | 5120 | 99 | 99 | 99 |
| 240 | 5270 | 99 | 99 | 98 |

Additional GPC analyses of the 240-minute reaction-time samples disclosed a Mn of 1200, a Mz of 23300, and polydispersity ratios of Mw-Mn=4.4 and Mz/Mn=19.4.

EXAMPLE 6

Another Method of Making the Polymer 325 grams of PM acetate solvent was introduced into an agitated, 2-liter, so-called "Parr"-type pressurized reactor via an addition line and was thereafter heated to a temperature of about 235° C. A monomer mixture comprising 168.8 grams of styrene, 393.8 grams of acrylic acid, and 562.5 grams of caprolactone was then added, via the addition line, to the 235° C.-PM acetate solvent over a period of about 1 hour. Upon completion of the addition of the monomer mixture, the addition line was flushed with about 50 additional grams of PM acetate. Thereafter, the desired SGA polymerization reaction was allowed to run its course in the 2-liter reactor for about 30 minutes. Samples were removed for analyses by GC and GPC.

GC analyses indicated the following weight percent conversions of monomer to polymer: styrene, 92%; acrylic acid, 72%; and caprolactone, 99%.

Unless otherwise noted, all percentages herein are based on weight of the indicated ingredient initially present.

GPC analyses indicated a Mn of 1210, a Mw of 6170, a Mz of 14630, and polydispersity ratios of Mw/Mn=5.1 and Mz/Mn=12.1.

The viscosity of the polymer-containing solution at room temperature was 1400 centipoises (cP), as determined using a Brookfield viscometer.

The percent solids of the polymer was 69 weight-percent. (The weight-percent of the solution indicates the amount of polymer therein; that is, the solvent and/or unreacted monomer that is present is not included as "solids".)

Successive dilutions of the polymer-containing solution, using additional PM acetate solvent, produced the following percent solids-viscosity profile:

TABLE VI

VISCOSITY PROFILE

| % Solids, Polymer | Brookfield Viscosity (cP) |
|---|---|
| 69 | 1400 |
| 50 | 110 |

The glass-transition temperature (Tg) of the polymer, after separation from the solvent, was found to be −39° C.

Additionally, the thus-separated polymer was found to exhibit a melt-point temperature (Tm) of +39° C., as determined utilizing a differential-scanning calorimeter (DSC).

EXAMPLE 7

Yet Another Method of Making the Polymer

The procedures of EXAMPLE 6 were substantially repeated, except that 112.5 grams of styrene was used (instead of 168.8 grams) and 450 grams of acrylic acid was used (instead of 393.8 grams); and the analytical results can be summarized as follows.

GC analyses indicated the following percent conversions of monomer to polymer: styrene, 92%; acrylic acid, 67%; and caprolactone, 99%.

GPC analyses indicated a Mn of 1130, a Mw of 6310, a Mz of 16120, and polydispersity ratios of Mw/Mn=5.6 and Mz/Mn=14.3.

The viscosity of the polymer solution at room temperature was 5000 centipoises (cP), as determined by Brookfield viscometer. The percent solids of the polymer was 65 weight percent. Successive dilutions of the polymer solution, using additional PM acetate solvent, produced the following percent solids-viscosity profile:

TABLE VII

VISCOSITY PROFILE

| % Solids, Polymer | Brookfield Viscosity (cP) |
|---|---|
| 65 | 5000 |
| 50 | 425 |

The Tg of the polymer, after separation from the solvent, was found to be −43° C. Additionally, the polymer exhibited a Tm of +32° C., determined via DSC.

EXAMPLE 8

Still Another Method of Making the Polymer

The procedures of EXAMPLE 7 were substantially repeated, except that the SGA polymerization reaction was allowed to run its course in the 2-liter reactor for about 90 minutes (instead of 30 minutes); and the analytical results can be summarized as follows.

GC analyses indicated the following percent conversions of monomer to polymer: styrene, 100%; acrylic acid, 96%; and caprolactone, 100%.

GPC analyses indicated a Mn of 1280, a Mw of 6550, a Mz of 15630, and polydispersity ratios of Mw/Mn=5.1 and Mz/Mn=12.2.

The viscosity of the polymer solution at room temperature was 2400 cP, as determined via Brookfield viscometer. The percent-solids of the polymer was 70 weight-percent. Successive dilutions of the polymer solution, using additional PM acetate solvent, produced the following percent solids-viscosity profile:

TABLE VIII

| VISCOSITY PROFILE | |
|---|---|
| % Solids, Polymer | Brookfield Viscosity (cP) |
| 70 | 2400 |
| 50 | 144 |

The Tg of the polymer, after separation from the solvent, was found to be −37° C. Additionally, the polymer exhibited a negligible Tm, as determined via DSC.

EXAMPLE 9

Yet Another Method of Making the Polymer

The procedures of EXAMPLE 7 were substantially repeated, except that the polymerization reaction temperature was 250° C. (instead of 235° C.); and the analytical results can be summarized as follows.

GC analyses indicated the following percent conversions of monomer to polymer: styrene, 100%; acrylic acid, 96%; and caprolactone, 100%.

GPC analyses indicated a Mn of 1290, a Mw of 5050, a Mz of 10960, and polydispersity ratios of Mw/Mn=3.9 and Mz/Mn=8.5.

The viscosity of the polymer solution at room temperature was 1200 cP, as determined via Brookfield viscometer. The percent-solids of the polymer was 70 weight-percent. Successive dilutions of the polymer solution, using additional PM acetate solvent, produced the following percent solids-viscosity profile:

TABLE IX

| VISCOSITY PROFILE | |
|---|---|
| % Solids, Polymer | Brookfield Viscosity (cP) |
| 70 | 1200 |
| 50 | 95 |

The Tg of the polymer, after separation from the solvent, was found to be −43° C. Additionally, the polymer exhibited a Tm of +37° C., determined by DSC.

EXAMPLE 10

Still Another Method of Making the Polymer

The procedures of EXAMPLE 9 were substantially repeated, except that the monomer mixture included 281.3 grams of styrene as well as 281.3 grams of acrylic acid (instead of 112.5 grams of styrene and 450 grams of acrylic acid).

GC analyses indicated the following percent conversions of monomer to polymer: styrene, 96%; acrylic acid, 91%; and caprolactone, 98%.

The viscosity of the polymer solution at room temperature was 2500 cP, determined via Brookfield viscometer. The percent solids of the polymer was 74 weight-percent. Successive dilutions of the polymer solution, using additional PM acetate solvent, produced the following percent solids-viscosity profile:

TABLE X

| VISCOSITY PROFILE | |
|---|---|
| % Solids, Polymer | Brookfield Viscosity (cP) |
| 74 | 2500 |
| 50 | 90 |

After completion of the reaction, the graft polymer-containing solution was passed through a thin-film evaporator to remove unreacted monomer and solvent.

GPC analyses indicated a Mn of 1330, a Mw of 3680, a Mz of 7020, and polydispersity ratios of Mw/Mn=2.8 and Mz/Mn=5.3.

The Tg of the graft polymer, after separation from the solvent, was found to be −32° C. Additionally, the polymer exhibited a Tm of +34° C., determined via DSC.

EXAMPLE 11

Another Method of Making the Polymer

The procedures of EXAMPLE 10 were substantially repeated, except that the monomer mixture comprised 268.2 grams of styrene, 320.4 grams of methacrylic acid, and 536.4 grams of caprolactone (instead of 281.3 grams of styrene, 281.3 grams of acrylic acid, and 562.5 grams of caprolactone); and the analytical results can be summarized as follows.

GC analyses indicated the following percent conversions of monomer to polymer: styrene, 92%; methacrylic acid, 71%; and caprolactone, 99%.

GPC analyses indicated a Mn of 880, a Mw of 2450, a Mz of 4770, and polydispersity ratios of Mw/Mn=2.8 and Mz/Mn=5.4.

The viscosity of the polymer solution at room temperature was 750 cP, determined via Brookfield viscometer. The percent-solids of the polymer was 68 weight-percent. Successive dilutions of the polymer solution, using additional PM acetate solvent, produced the following percent solids-viscosity profile:

TABLE XI

| VISCOSITY PROFILE | |
|---|---|
| % Solids, Polymer | Brookfield Viscosity (cP) |
| 68 | 750 |
| 50 | 80 |

The Tg of the polymer, after separation from the solvent, was found to be −39° C. Additionally, the polymer exhibited a Tm of +32° C., determined via DSC.

EXAMPLE 12

Yet Another Method of Making the Polymer

The procedures of EXAMPLE 6 were substantially repeated, except that the monomer mixture comprised 281.3 grams of styrene, 393.8 grams of methacrylic acid, and 450 grams of caprolactone (instead of 168.8 grams of styrene, 393.8 grams of acrylic acid, and 562.5 grams of caprolactone) and the SGA polymerization reaction was allowed to run its course in the 2-liter reactor for about 60 minutes (instead of 30 minutes). The analytical results can be summarized as follows.

GC analyses indicated the following percent conversions of monomer to polymer: styrene, 97%; methacrylic acid, 78%; and caprolactone, 99%.

GPC analyses indicated a Mn of 1020, a Mw of 4170, a Mz of 10030, and polydispersity ratios of Mw/Mn=4.1 and Mw/Mn=9.8.

The viscosity of the polymer solution at room temperature was 3000 cP, determined via Brookfield viscometer. The percent-solids of the polymer was 68 weight-percent. Successive dilutions of the polymer solution, using additional PM acetate solvent, produced the following percent solids-viscosity profile:

TABLE XII

| VISCOSITY PROFILE | |
| --- | --- |
| % Solids, Polymer | Brookfield Viscosity (cP) |
| 68 | 3000 |
| 50 | 148 |

The Tg of the polymer, after separation from the solvent, was found to be −34° C. Additionally, the polymer exhibited a Tm of +31° C., determined via DSC.

EXAMPLE 13

Another Method of Making the Polymer

The procedures of EXAMPLE 12 were substantially repeated, except that the monomer mixture comprised 337.5 grams of styrene, 187.5 grams of acrylic acid, and 225 grams of caprolactone (instead of 281.3 grams of styrene, 393.8 grams of methacrylic acid, and 450 grams of caprolactone). Also, 250 grams of PM acetate solvent was introduced into the agitated 2-liter pressurized reactor (instead of 325 grams), and the reaction temperature was about 220° C. (instead of 235° C.). The analytical results can be summarized as follows.

GC analyses indicated the following weight percent conversions of monomer to polymer: styrene, 96%; acrylic acid, 91%; and caprolactone, 98%.

GPC analyses indicated a Mn of 1700, a Mw of 10010, a Mz of 21190, and polydispersity ratios of Mw/Mn=5.9 and Mz/Mn=12.5.

The viscosity of the polymer solution at room temperature was 108,000 cP, determined via Brookfield viscometer. The percent-solids of the polymer was 72 weight-percent. Successive dilutions of the polymer solution, using additional PM acetate solvent, produced the following percent solids-viscosity profile.

TABLE XIII

| VISCOSITY PROFILE | |
| --- | --- |
| % Solids, Polymer | Brookfield Viscosity (cP) |
| 72 | 108,000 |
| 50 | 650 |

The Tg of the polymer, after separation from the solvent, was found to be −4° C. Additionally, the polymer exhibited no detectable Tm, as determined via DSC. (Such a material is thus deemed to be amorphous, not crystalline.)

EXAMPLE 14

Still Another Method of Making the Polymer

The procedures of EXAMPLE 13 were substantially repeated, except that the monomer mixture included 300 grams of styrene and 262.5 grams of caprolactone (instead of 337.5 grams of styrene and 225 grams of caprolactone), and the SGA polymerization reaction was allowed to run its course in the 2-liter reactor for about 90 minutes (instead of 60 minutes). The analytical results can be summarized as follows.

GC analyses indicated the following weight percent conversions of monomer to polymer: styrene, 97%; acrylic acid, 93%; and caprolactone, 99%.

GPC analyses indicated a Mn of 2720, a Mw of 10060, a Mz of 20670, and polydispersity ratios of Mw/Mn=3.7 and Mz/Mn=7.6.

The viscosity of the polymer solution at room temperature was 65,000 cP, determined via Brookfield viscometer. The percent-solids of the polymer was 72 weight-percent. Successive dilutions of the polymer solution, using addition PM acetate solvent, produced the following weight percent solids-viscosity profile.

TABLE XIV

| VISCOSITY PROFILE | |
| --- | --- |
| % Solids, Polymer | Brookfield Viscosity (cP) |
| 72 | 65,000 |
| 50 | 500 |

The Tg of the polymer, after separation from the solvent, was found to be −18° C. Additionally, the polymer exhibited a Tm of +37° C., determined via DSC.

EXAMPLE 15

Yet Another Method of Making the Polymer

The procedures of EXAMPLE 14 were substantially repeated, except that the monomer mixture included 262.5 grams of styrene and 300 grams of caprolactone (instead of 300 grams of styrene and 262.5 grams of caprolactone), and the SGA polymerization reaction was allowed to run its course in the 2-liter reactor for about 120 minutes (instead of 90 minutes). The analytical results can be summarized as follows.

GC analyses indicated the following weight percent conversions of monomer to polymer: styrene, 98%; acrylic acid, 93%; and caprolactone, 99%.

GPC analyses indicated a Mn of 2570, a Mw of 9400, a Mz of 19360, and polydispersity ratios of Mw/Mn=3.7 and Mz/Mn=7.5.

The viscosity of the polymer solution at room temperature was 31,000 cP, determined via Brookfield viscometer. The percent-solids of the polymer was 73 weight-percent. Successive dilutions of the polymer solution, using additional PM acetate solvent, produced the following weight percent solids-viscosity profile:

TABLE XV

| VISCOSITY PROFILE | |
| --- | --- |
| % Solids, Polymer | Brookfield Viscosity (cP) |
| 73 | 31,000 |
| 50 | 350 |

The Tg of the polymer, after separation from the solvent, was found to be −12° C. Additionally, the polymer exhibited a Tm of +37° C., determined via DSC.

EXAMPLE 16

Still Another Method of Making the Polymer

The procedures of EXAMPLE 10 were substantially repeated, except that the monomer mixture included 562.5 grams of styrene and 281.3 grams of caprolactone (instead of 281.3 grams of styrene and 562.5 grams of caprolactone), and the PM acetate was heated to a temperature of 220° C. (instead of 250° C.). The analytical results can be summarized as follows.

GC analyses indicated the following weight percent conversions of monomer to polymer: styrene, 93%; acrylic acid, 89%; and caprolactone, 99%.

GPC analyses indicated a Mn of 2180, a Mw of 12880, a Mz of 98240, and polydispersity ratios of Mw/Mn=5.9 and Mz/Mn=45.1.

The viscosity of the polymer solution at room temperature was 132,000 cP, determined via Brookfield viscometer. The percent-solids of the polymer was 74 weight-percent. Successive dilutions of the polymer solution, using additional PM acetate solvent, produced the following weight percent solids-viscosity profile:

TABLE XVI

| VISCOSITY PROFILE | |
|---|---|
| % Solids, Polymer | Brookfield Viscosity (cP) |
| 74 | 132,000 |
| 50 | 750 |

The Tg of the polymer, after separation from the solvent, was found to be +11° C. Additionally, the polymer exhibited no detectable Tm, as determined via DSC.

EXAMPLE 17

Yet Another Method of Making the Polymer

The procedures of EXAMPLE 10 were substantially repeated, except that the PM acetate was heated to a temperature of 220° C. (instead of 250° C.); and the analytical results can be summarized as follows.

GC analysis indicated the following percent conversions of monomer to polymer: styrene, 80%; acrylic acid, 69%; and caprolactone, 99%.

GPC analysis indicated a Mn of 1620, a Mw of 11160, a Mz of 26260, and polydispersity ratios of Mw/Mn=6.9 and Mz/Mn=16.2.

The viscosity of the polymer solution at room temperature was 21,000 cP, determined via Brookfield viscometer. The percent-solids of the polymer was 68 weight-percent. Successive dilutions of the polymer solution, using additional PM acetate solvent, produced the following weight percent solids-viscosity profile:

TABLE XVII

| VISCOSITY PROFILE | |
|---|---|
| % Solids, Polymer | Brookfield Viscosity (cP) |
| 68 | 21,000 |
| 50 | 800 |

The Tg of the polymer, after separation from the solvent, was found to be −33° C. Additionally, the polymer exhibited a Tm of +34° C., determined via DSC.

EXAMPLE 18

One Method of Curing the Polymer Including the Physical Properties of a Polymer so Cured 25 grams of the polymer-containing solution, produced in accordance with EXAMPLE 13, was formulated into a thermosetting coating as follows.

3.75 grams of melamine (an amino resin) was added to the polymer-containing solution, together with about 0.225 grams of a 10 weight-percent solution (in PM acetate) of Dow Corning 57 (referred to herein as "DC 57"). The DC 57 is generically referred to as a silicone oil that is principally used as a paint additive.

The melamine functions as a polymer-curing ingredient; and, in accordance with certain principles of the present invention, the DC 57 silicone oil ingredient functions as a so-called "slip" agent.

After mixing the polymer-containing solution for 60 minutes, the resultant mixture was applied to a cold-rolled steel substrate, and then baked at a temperature of 175° C. for 15 minutes. During this baking step, substantially all of the solvent present in the thus-curing polymer mixture was driven off, thereby forming a coating having a thickness of about 2 mils. The thus-cured coating exhibited a reverse-impact resistance of 40 in.-lbs., a direct-impact resistance of 120 in.-lbs.; a Konig hardness of 98 and a pencil hardness of 2H. [See, e.g., ASTM Testing Procedure Nos. D 2794-84 and D 3363-74].

EXAMPLE 19

The Physical Properties of Yet Another Polymer so Cured 25 grams of the polymer-containing solution, produced in accordance with EXAMPLE 14, was also formulated into a thermoset coating, substantially as described in EXAMPLE 18, except that the bake time was for 30 minutes (instead of 15 minutes). The final, melamine-cured coating exhibited a reverse-impact resistance of 84 in.-lbs., a direct-impact resistance of 136 in.-lbs., a Konig hardness of 69, and a pencil hardness of H.

EXAMPLE 20

The Physical Properties of Still Another Polymer so Cured 25 grams of the polymer-containing solution, produced in accordance with EXAMPLE 15, was likewise formulated into a thermoset coating, substantially as described in EXAMPLE 18, except that the bake time was for 45 minutes (instead of 15 minutes). The final, melamine-cured coating exhibited a reverse-impact resistance of 70 in.-lbs., a direct-impact resistance of 112 in.-lbs., a Konig hardness of 50, and a pencil hardness of 2B.

EXAMPLE 21

The Physical Properties of Yet Another Polymer so Cured 25 grams of the polymer-containing solution, produced in accordance with EXAMPLE 16, was also formulated into a thermoset coating, substantially as described in EXAMPLE 18. The final, melamine-cured coating exhibited a reverse-impact resistance of 30 in.-lbs., a direct-impact resistance of 96 in.-lbs., a Konig hardness of 116, and a pencil hardness of 2H.

EXAMPLE 22

Yet Another Method of Making the Polymer

A monomer mixture, comprising 5.0 grams of alpha-methyl styrene (AMS), 4.4 grams of styrene, 6.3 grams of delta-valerolactone (DVL), and 3.0 grams of acrylic acid (AA), was added to 6.3 grams of ethyl benzene (ETB) solvent, thereby producing a solution.

Approximately 3 grams of the ETB-based solution was introduced into each one of several open glass ampoules capable of sustaining relatively high pressure. Each of the solution-containing ampoules was thereafter frozen, utilizing liquid nitrogen ($N_2$); evacuated; brought back to room temperature; and then purged with $N_2$ gas. This procedure was repeated three times before sealing each ampoule.

The sealed, solution-containing glass ampoules were then immersed in a conventional silicone-oil bath heated to 230° C., whereupon solution-polymerization of the above identified monomer-mixture ingredients took place in the glass ampoules. During the course of the polymerization reaction, the oil bath-immersed, sealed, ampoule-contained samples were removed from the silicone-oil bath, at time intervals of 15, 30, 45, and 60 minutes (after being thus-immersed), for analyses by gas chromatography (GC) and gel-permeation chromatography (GPC).

The weight percent-conversion of monomer to polymer together with the weight-average molecular weight (Mw) of the polymer (as determined by GC and GPC), as a function of reaction time, are summarized as follows:

TABLE XVIII

MONOMER CONVERSION RATES

| Reaction Time, | | % Conversion of Monomer to Polymer, based upon: | | | |
|---|---|---|---|---|---|
| Minutes | Mw | AMS | Styrene | AA | DVL |
| 15 | 4450 | 55.5 | 91.5 | 95.4 | 76.3 |
| 30 | 4150 | 60.7 | 95.6 | 99.2 | 78.7 |
| 45 | 4150 | 63.5 | 96.9 | 99.7 | 78.7 |
| 60 | 4050 | 61.8 | 97.0 | 99.7 | 85.8 |

Additional GPC analyses of the 60-minute reaction-time samples further disclosed a number-average molecular weight (Mn) of 1120, a sedimentation-value molecular weight (Mz) of 15070, and polydispersity ratios of Mw/Mn=3.6 and Mz/Mn=13.5.

EXAMPLE 23

Still Another Method of Making the Polymer

A monomer mixture, comprising 3.7 grams of styrene, 5.7 grams of tertiary-butyl styrene (TBS), 2.8 grams of acrylic acid (AA), and 6.6 grams of caprolactone (CAP), was added to 6.3 grams of methyl amyl ketone (MAK) solvent, thereby producing a solution.

Approximately 3 grams of the MAK-based solution was introduced into each one of several open glass ampoules capable of sustaining relatively high pressure. Each of the solution-containing ampoules was thereafter frozen, utilizing liquid nitrogen ($N_2$); evacuated; brought back to room temperature; and then purged with $N_2$ gas. This procedure was repeated three times before sealing each ampoule.

The sealed, solution-containing glass ampoules were then immersed in a conventional silicone-oil bath heated to 210° C., whereupon solution-polymerization of the above identified monomer-mixture ingredients took place in the glass ampoules. During the course of the polymerization reaction, the oil bath-immersed, sealed, ampoule-contained samples were removed from the silicone-oil bath, at time intervals of 30, 60, 90, 120 and 150 minutes (after being thus-immersed), for analyses by gas chromatography (GC) and gel-permeation chromatography (GPC).

The weight percent-conversion of monomer to polymer together with the weight-average molecular weight (Mw) of the polymer (as determined by GC and GPC), as a function of reaction time, are summarized as follows:

TABLE XIX

MONOMER CONVERSION RATES

| Reaction Time, | | % Conversion of Monomer to Polymer, based upon: | | | |
|---|---|---|---|---|---|
| Minutes | Mw | Styrene | TBS | AA | CAP |
| 30 | 19,000 | 84.8 | 83.8 | 75.6 | 76.9 |
| 60 | 23,050 | 92.2 | 92.1 | 86.1 | 96.7 |
| 90 | 23,350 | 94.2 | 94.4 | 89.4 | 97.9 |
| 120 | 24,320 | 95.5 | 95.7 | 91.4 | 98.3 |
| 150 | 23,040 | 96.2 | 96.4 | 93.2 | 98.3 |

Additional GPC analyses of the 150-minute reaction-time samples further disclosed a number-average molecular weight (Mn) of 3770, a sedimentation-value molecular weight (Mz) of 59,440, and polydispersity ratios of Mw/Mn=6.1 and Mz/Mn=15.8.

EXAMPLE 24

Yet Another Method of Making the Polymer

A monomer mixture, comprising 4.4 grams of styrene, 5.0 grams of vinyl toluene (VT), 2.8 grams of acrylic acid (AA), and 6.6 grams of caprolactone (CAP), was added to 6.3 grams of xylene solvent, thereby producing a solution.

Approximately 3 grams of the xylene-based solution was introduced into each one of several open glass ampoules capable of sustaining relatively high pressure. Each of the solution-containing ampoules was thereafter frozen, utilizing liquid nitrogen ($N_2$); evacuated; brought back to room temperature; and then purged with $N_2$ gas. This procedure was repeated three times before sealing each ampoule.

The sealed, solution-containing glass ampoules were then immersed in a conventional silicone-oil bath heated to 210° C., whereupon solution-polymerization of the above identified monomer-mixture ingredients took place in the glass ampoules. During the course of the polymerization reaction, the oil bath-immersed, sealed, ampoule-contained samples were removed from the silicone-oil bath, at time intervals of 30, 60, 90, 120 and 150 minutes (after being thus-immersed), for analyses by gas chromatography (GC) and gel-permeation chromatography (GPC).

The weight percent-conversion of monomer to polymer together with the weight-average molecular weight (Mw) of the polymer (as determined by GC and GPC), as a function of reaction time, are summarized as follows:

TABLE XX

MONOMER CONVERSION RATES

| Reaction Time, | | % Conversion of Monomer to Polymer, based upon: | | | |
|---|---|---|---|---|---|
| Minutes | Mw | Styrene | VT | AA | CAP |
| 30 | 25,960 | 90.6 | 90.5 | 83.8 | 88.1 |

TABLE XX-continued
MONOMER CONVERSION RATES

| Reaction Time, | | % Conversion of Monomer to Polymer, based upon: | | | |
| --- | --- | --- | --- | --- | --- |
| Minutes | Mw | Styrene | VT | AA | CAP |
| 60 | 28,670 | 94.3 | 94.6 | 90.8 | 97.2 |
| 90 | 28,490 | 95.5 | 95.8 | 92.7 | 97.8 |
| 120 | 29,340 | 96.1 | 96.4 | 93.7 | 98.3 |
| 150 | 28,220 | 96.8 | 97.2 | 95.0 | 98.5 |

Additional GPC analyses of the 150-minute reaction-time samples further disclosed a number-average molecular weight (Mn) of 4190, a sedimentation-value molecular weight (Mz) of 76,300, and polydispersity ratios of Mw/Mn=6.7 and Mz/Mn=18.2.

EXAMPLE 25

Still Another Method of Making the Polymer

A monomer mixture, comprising 4.0 grams of styrene, 5.3 grams of ortho-chloro styrene (OCS), 2.8 grams of acrylic acid (AA), and 6.6 grams of caprolactone (CAP), was added to 6.3 grams of cellosolve acetate (CSA) solvent, thereby producing a solution.

Approximately 3 grams of the CSA-based solution was introduced into each one of several open glass ampoules capable of sustaining relatively high pressure. Each of the solution-containing ampoules was thereafter frozen, utilizing liquid nitrogen ($N_2$); evacuated; brought back to room temperature; and then purged with $N_2$ gas. This procedure was repeated three times before sealing each ampoule.

The sealed, solution-containing glass ampoules were then immersed in a conventional silicone-oil bath heated to 210° C., whereupon solution-polymerization of the above identified monomer-mixture ingredients took place in the glass ampoules. During the course of the polymerization reaction, the oil bath-immersed, sealed, ampoule-contained samples were removed from the silicone-oil bath, at time intervals of 30, 60, 90, 120 and 150 minutes (after being thus-immersed), for analyses by gas chromatography (GC) and gel-permeation chromatography (GPC).

The weight percent-conversion of monomer to polymer together with the weight-average molecular weight (Mw) of the polymer (as determined by GC and GPC), as a function of reaction time, are summarized as follows:

TABLE XXI
MONOMER CONVERSION RATES

| Reaction Time, | | % Conversion of Monomer to Polymer, based upon: | | | |
| --- | --- | --- | --- | --- | --- |
| Minutes | Mw | Styrene | OCS | AA | CAP |
| 30 | 20,250 | 93.4 | 94.6 | 82.0 | 95.7 |
| 60 | 20,320 | 95.7 | 96.7 | 86.7 | 98.4 |
| 90 | 20,190 | 97.5 | 98.1 | 90.7 | 98.9 |
| 120 | 19,780 | 98.0 | 98.5 | 92.3 | 98.8 |
| 150 | 21,250 | 98.2 | 98.7 | 93.0 | 98.9 |

Additional GPC analyses of the 150-minute reaction-time samples further disclosed a number-average molecular weight (Mn) of 3050, a sedimentation-value molecular weight (Mz) of 57,590, and polydispersity ratios of Mw/Mn=7.0 and Mz/Mn=18.9.

EXAMPLE 26

Yet Another Method of Making the Polymer

A monomer mixture, comprising 9.4 grams of styrene, 3.0 grams of acrylic acid (AA), and 6.3 grams of pivalolactone (PVL), was added to 6.3 grams of cellosolve acetate (CSA) solvent, thereby producing a solution.

Approximately 3 grams of the CSA-based solution was introduced into each one of several open glass ampoules capable of sustaining relatively high pressure. Each of the solution-containing ampoules was thereafter frozen, utilizing liquid nitrogen ($N_2$); evacuated; brought back to room temperature; and then purged with $N_2$ gas. This procedure was repeated three times before sealing each ampoule.

The sealed, solution-containing glass ampoules were then immersed in a conventional silicone-oil bath heated to 200° C., whereupon solution-polymerization of the above identified monomer-mixture ingredients took place in the glass ampoules. During the course of the polymerization reaction, the oil bath-immersed, sealed, ampoule-contained samples were removed from the silicone-oil bath, at time intervals of 30, 60, 90, 120 and 150 minutes (after being thus-immersed), for analyses by gas chromatography (GC) and gel-permeation chromatography (GPC).

The weight percent-conversion of monomer to polymer together with the weight-average molecular weight (Mw) of the polymer (as determined by GC and GPC), as a function of reaction time, are summarized as follows:

TABLE XXII
MONOMER CONVERSION RATES

| Reaction Time, | | % Conversion of Monomer to Polymer, based upon: | | |
| --- | --- | --- | --- | --- |
| Minutes | Mw | Styrene | AA | PVL |
| 30 | 20,210 | 87.3 | 93.7 | 89.6 |
| 60 | 20,130 | 90.9 | 96.3 | 97.0 |
| 90 | 19,430 | 95.0 | 97.8 | 99.0 |
| 120 | 20,300 | 94.2 | 98.3 | 99.7 |
| 150 | 21,060 | 95.3 | 98.7 | 99.8 |

Additional GPC analyses of the 150-minute reaction-time samples further disclosed a number-average molecular weight (Mn) of 3500, a sedimentation-value molecular weight (Mz) of 49,420, and polydispersity ratios of Mw/Mn=6.0 and Mz/Mn=14.1.

EXAMPLE 27

Still Another Method of Making the Polymer

A monomer mixture, comprising 9.4 grams of styrene, 3.0 grams of acrylic acid (AA), and 6.4 grams of thio-butyrolactone (TBL), was added to 6.3 grams of cellosolve acetate (CSA) solvent, thereby producing a solution.

Approximately 3 grams of the CSA-based solution was introduced into each one of several open glass ampoules capable of sustaining relatively high pressure. Each of the solution-containing ampoules was thereafter frozen, utilizing liquid nitrogen ($N_2$); evacuated; brought back to room temperature; and then purged with $N_2$ gas. This procedure was repeated three times before sealing each ampoule.

The sealed, solution-containing glass ampoules were then immersed in a conventional silicone-oil bath heated to 200° C., whereupon solution-polymerization of the above identified monomer-mixture ingredients took place in the glass ampoules. During the course of the polymerization reaction, the oil bath-immersed, sealed, ampoule-contained samples were removed from the silicone-oil bath, at time intervals of 30, 60, 90, 120 and 150 minutes (after being thus-immersed), for analyses by gas chromatography (GC) and gel-permeation chromatography (GPC).

The weight percent-conversion of monomer to polymer together with the weight-average molecular weight (Mw) of the polymer (as determined by GC and GPC), as a function of reaction time, are summarized as follows:

TABLE XXIII
MONOMER CONVERSION RATES

| Reaction Time, Minutes | Mw | % Conversion of Monomer to Polymer, based upon: | | |
|---|---|---|---|---|
| | | Styrene | AA | TBL |
| 30 | 17,250 | 83.8 | 82.5 | 5.9 |
| 60 | 16,330 | 88.6 | 87.5 | 9.8 |
| 90 | 15,600 | 90.6 | 90.8 | 5.9 |
| 120 | 15,500 | 92.5 | 91.7 | 13.7 |
| 150 | 15,400 | 93.7 | 92.8 | 17.6 |

Additional GPC analyses of the 150-minute reaction-time samples further disclosed a number-average molecular weight (Mn) of 2560, a sedimentation-value molecular weight (Mz) of 42,900, and polydispersity ratios of Mw/Mn=6.0 and Mz/Mn=16.8.

EXAMPLE 28

Alkali-Solubility of Polymer

The graft polymers of EXAMPLES 7 and 9–11 were each tested, as described below, to demonstrate the alkali-solubility of the graft polymer of the present invention.

A graft polymer sample of each of EXAMPLES 7 and 9–11 was passed through a thin-film evaporator to separate the graft polymer from solvent and unreacted monomer, resulting in the production of a 100 wt.-% "total solids" (TS) graft polymer sample (i.e., a sample that was virtually free of volatile material). One gram of the 100 wt.-% TS graft polymer was added to 20 grams of de-ionized water. The polymer-containing water was then agitated and heated to 50° C. while ammonium hydroxide was added thereto until the graft polymer dissolved. After the graft polymer dissolved, the pH of the resultant solution was determined; and the alkali-soluble aspect of the polymer of the present invention is indicated in the following table.

TABLE XXIV
ALKALINE SOLUTIONS OF POLYMER

| Polymer | Solution pH |
|---|---|
| Example 7 | 9.1 |
| Example 9 | 9.0 |
| Example 10 | 9.2 |
| Example 11 | 8.9 |

EXAMPLE 29

Floor-Finish Application

The graft polymer of EXAMPLE 10 was also used to produce a floor-finish coating, in accordance with the following compositional makeup. The indicated weight of the individual components is based upon total weight of the floor-finish composition.

TABLE XXV
FLOOR FINISH COMPOSITION

| Components or Ingredients | Wt. % |
|---|---|
| De-ionized water | 44.4 |
| Emulsion polymer | 31.14 |
| Polymer solution | 10.66 |
| Wax emulsion | 6. |
| DEGMME | 4. |
| Crosslinking agent | 2. |
| Surfactant | 1. |
| TBEP | 0.8 |

As used herein, the term "emulsion polymer" means a polymer made via an emulsion-polymerization reaction. The above-indicated emulsion polymer, more particularly, was a commercially-available styrene-acrylic emulsion polymer (sold by S. C. Johnson & Son, Inc., of Racine, Wisconsin, under the brand "C-41") comprising about 35 wt.-% total solids (i.e., about 65 wt.-%, or the remainder thereof, constituted volatile components).

The sample of graft polymer of EXAMPLE 10 was dissolved in aqueous ammonia, following procedures similar to those of EXAMPLE 28, to produce a 15 wt.-% TS solution of graft polymer in aqueous ammonia. (Such is referred to as "polymer solution" in Table XXV above.)

The above-indicated wax emulsion was, more particularly, an unoxidized low-density polyethylene emulsion (commercially available by Rohm & Haas Co., of Philadelphia, Pennsylvania, under the brand "PolyEm 20") comprising about 40 wt.-% total solids (i.e., about 60 wt.-% of the remainder thereof, constituted volatile components).

DEGMME is, more particularly, diethylene glycol monomethyl ether.

The above-indicated crosslinking agent was, more particularly, $Zn(NH_3)(HCO_3)_2$, 15 wt.-% TS.

The above-indicated surfactant was, more particularly, a commercially-available surfactant (sold by E. I. du Pont de Nemours & Co., of Wilmington, Delaware, under the brand "ZONYL FSJ") comprising about 1 wt.-% TS.

TBEP is, more particularly, tris-(butoxyethyl) phosphate.

The composition of Table XXV was formulated as follows. The emulsion polymer, the polymer solution, and the DEGMME and surfactant ingredients were mixed together in the de-ionized water. Thereafter, the crosslinking agent, then the TBEP ingredient, and finally the wax emulsion, were individually slowly added, each with agitation, to produce a 16 wt.-% TS floor-finish solution having a pH of 8.6, for application to a vinyl-tile test specimen.

Upon application of the floor-finish formulation to the vinyl tile, the formulation was observed to provide the vinyl tile with a non-tacky coating (or "finish") that dried within 10 minutes (after application). Such finish, moreover, provided the vinyl tile with desirable leveling, scratch resistance, and re-coatability properties.

For example, a commercially-available glossmeter was applied to the dried, coated vinyl tile surface and a digital readout was obtained. In particular, the 60° gloss value of the coated vinyl tile was determined as being 70.9 after application of two coats of finish. (The glossmeter was calibrated immediately prior to taking a reading.)

EXAMPLE 30

Ink-Dispersant Application

The graft polymer of EXAMPLE 10 was further used to produce an ink dispersant, in accordance with the following compositional makeup.

TABLE XXVI

| INK-DISPERSANT COMPOSITION | |
|---|---|
| Components or ingredients | Wt. % |
| De-ionized water | 51.59 |
| Graft polymer | 34. |
| Ammonium hydroxide solution | 7.3 |
| Isopropanol | 5.65 |
| Propylene glycol | 1.46 |

The above-identified graft polymer was a 100 wt.-% TS sample of the graft polymer made in accordance with EXAMPLE 10. Such graft polymer (which was made from about 50 wt.-% CAP, about 25 wt.-% styrene, and about 25 wt.-% AA) is characterized as a polymeric resin.

The above-mentioned ammonium hydroxide solution was a 28% solution of ammonia in water. (This means that 100 grams of such aqueous ammonia solution included 28 grams of $NH_3$.)

The ink-dispersant ingredients of Table XXVI were combined to produce an aqueous ammonia-based mixture. Such mixture was heated to 70° C. until all the resin (i.e., the graft polymer) dissolved, thereby producing a resin cut. The term "resin cut" is herein defined as a solution of polymeric resin (e.g., the graft polymer disclosed herein) in aqueous ammonium hydroxide. The pH of the resin cut was found to be 8.8. A pigment was dispersed throughout the resin in accordance with the following compositional makeup.

TABLE XXVII

| PIGMENT-VEHICLE COMPOSITION | |
|---|---|
| Components or ingredients | Wt. % |
| Pigment | 65 |
| Resin cut | 30 |
| De-ionized water | 5 |

The above-indicated pigment was a white pigment, in particular, $TiO_2$ (purchased from American Cyanamid Company, of Wayne, New Jersey).

The resin cut indicated in Table XXVII is that resin cut discussed above in connection with Table XXVI.

The ingredients indicated in Table XXVII were combined, and mixed, to produce a pigment vehicle. The pigment vehicle of TABLE XXVII was let down with an emulsion polymer having a weight-average molecular weight (Mw) of about 200,000, to produce an ink vehicle. (The term "let down" as herein used means to incorporate a high molecular weight emulsion polymer into a pigment dispersion of this type.) In particular, the pigment vehicle of Table XXVII was let down, by the above-mentioned emulsion polymer, in accordance with the following compositional makeup.

TABLE XXVIII

| INK-VEHICLE COMPOSITION | |
|---|---|
| Components or ingredients | Wt. % |
| Pigment vehicle | 60 |
| Emulsion polymer | 35 |
| De-ionized water | 5 |

The pigment vehicle indicated in Table XXVIII is that pigment vehicle discussed above in connection with Table XXVII.

The emulsion polymer indicated in Table XXVIII is that emulsion polymer briefly mentioned in connection with Table XXVII. Such emulsion polymer, more particularly, is a styrene-acrylic acid emulsion polymer (sold by S. C. Johnson & Son, Inc., of Racine, Wisconsin, under the brand "74F") that is characterized as a 49 wt.-% TS emulsion polymer dispersed in water (i.e., 49 wt.-% non-volatile materials dispersed in water).

The ingredients indicated in Table XXVIII were combined, and mixed, to produce an ink vehicle. The resulting ink vehicle was observed to be about 57.6 wt.-% TS and to have a viscosity of about 18.7 seconds (determined utilizing a No. 2 Zahn cup).

The thus-produced ink vehicle was "drawn down on" (i.e., applied onto) a gloss card, and was allowed to dry overnight at room temperature. (The term "gloss card" as used herein is a commercially-available substrate onto which a surface coating can be applied.) The above-mentioned glossmeter was utilized to determine the gloss value of the overnight-dried gloss card, following procedures similar to those set forth in EXAMPLE 29; and the 60° gloss value was determined as being 45.1. Further, the glossy coating exhibited good scratch resistance, and demonstrated good adhesion to the gloss-card substrate.

EXAMPLE 31

Overprint-Varnish Application

The graft polymer of EXAMPLE 10 was also used to produce water-based overprint varnish, in accordance with the below-presented compositional makeup.

TABLE XXIX

| OVERPRINT-VARNISH COMPOSITION | |
|---|---|
| Components or ingredients | Wt. % |
| Emulsion polymer | 59. |
| Resin cut | 25. |
| Slip aid | 10. |
| Zinc oxide | 5.9 |
| Antifoam agent | 0.1 |

The emulsion polymer indicated in Table XXIX was a styrene-acrylic acid emulsion polymer (sold by S. C. Johnson & Son, Inc., of Racine, Wisconsin, under the brand "Joncryl 77"), characterized as having a weight-average molecular weight (Mw) of about 200,000 and being 48 wt.-% TS.

The resin cut indicated in Table XXIX was an ammonium hydroxide resin cut produced substantially as outlined above in connection with EXAMPLE 30, and utilizing a graft polymer sample of EXAMPLE 10.

The slip agent indicated in Table XXIX was a polyethylene wax emulsion slip agent (sold by S. C. Johnson & Son, Inc., of Racine, Wisconsin, under the brand "Jonwax 26"), characterized as being 25 wt.-% TS. A so-called "slip agent" is a material that is typically added to a formulation to improve slip, i.e. reduce the coefficient of friction, of the formulation. The term "coefficient of friction" includes the static as well as the dynamic situation. (See, e.g., I. H. Shames, "Engineering Mechanics", 2nd. edition, Volume 1, published 1966 by Prentice-Hall, Inc., of Englewood Cliffs, New Jersey, at page 173.)

The antifoam agent indicated in Table XXIX was a mineral oil derivative (sold by Witco Corporation, of New York, New York, under the brand "Bubble Breaker 748").

A clear, overprint varnish was produced, utilizing the above-discussed ingredients (presented in Table XXIX), as follows.

The resin cut was slowly added, with agitation, to the emulsion polymer. The slip aid, then the zinc oxide, and finally the antifoam agent, were each slowly added, with agitation, to the resin cut-containing emulsion polymer, to produce an overprint varnish blend. The overprint varnish blend had a pH of 9.1 and a viscosity of 110 cPs.

The thus-produced blend was drawn down on a printed card utilizing a commercially-available wire-wound drawdown rod (i.e. a No. 6 RDS rod). The card-applied overprint varnish was then dried at 125° C. for 10 seconds.

The adhesion to the card was found to be excellent. The card-adhering overprint varnish film was furthermore found to possess good flexibility and scratch-resistance qualities.

Following procedures similar to those set forth in EXAMPLE 29, a glossmeter was utilized to determine the gloss value of the overprint varnish film. The 60° gloss value was determined as being 53.5.

EXAMPLE 32

Crystallinity Aspect of the Graft Polymer

As we mentioned above, the graft polymer of the present invention was found to possess crystallinity in certain situations.

It is well known that some polymers possess crystallinity, principally because the polymer structure is conducive to close packing. (See, e.g., G. Odian, "Principles of Polymerization", 2nd edition, published 1981 by John Wiley & Sons, Inc., at pages 28–29.) A graft polymer, however, because of its side chains, is generally not thought of as a close-packing structure. Still further, it is generally well known that copolymerization reduces the tendency to produce a crystalline product. (Id. at page 144.) Accordingly, the crystallinity aspect of our invention was indeed surprising.

Thermal transistions of polymeric materials are typically investigated to determine whether a particular polymeric material is amorphous, crystalline, or semi-crystalline. For example, the crystalline melting temperature (Tm) and the glass transition temperature (Tg) are two major types of transistion temperatures that are utilized to investigate the crystalline and amorphous aspects of such materials. (Id., at pages 29-31.)

We discovered, upon investigating this aspect of our invention, utilizing these well-known techniques, that the crystalline/amorphous aspect of our invention appears to be related to the mole ratio of (1) cyclic ester molecules that are capable of ring-opening in the presence of a carboxylic acid moiety to (2) ethylenically-unsaturated carboxylic acid monomer, that is present in our graft polymer.

In particular, graft polymers prepared by the SGA process of our invention were utilized in our investigation. Thermal analyses, utilizing DSC techniques (mentioned above), were conducted on graft polymer samples of EXAMPLES 11-17, 22 and 26 to investigate presence of a Tm. (Presence of a Tm is indicative of crystallinity.)

As was discussed above, the graft polymer samples of EXAMPLES 13 through 17 were produced by the SGA process, utilizing PM acetate as the solvent, and including styrene, acrylic acid (AA), and epsilon-caprolactone (CAP) as the monomeric reactants. The graft polymer samples of EXAMPLES 11 and 12 were produced, utilizing the same solvent and substantially the same monomeric reactants (of EXAMPLES 13-17) except that methacrylic acid (MAA) was substituted for acrylic acid. The graft polymer of EXAMPLE 22 was produced by the SGA process, utilizing ethyl benzene solvent, and including acrylic acid, delta-valerolactone (DVL), and a mixture of vinylic monomers (namely, alpha-methyl styrene and styrene, instead of styrene only) as the monomeric reactants. The graft polymer of EXAMPLE 26 was produced, utilizing cellosolve acetate solvent, and including styrene, acrylic acid, and pivalolactone (PVL) as the monomeric reactants.

TABLE XXX

| \multicolumn{3}{c}{RESULTS OF INVESTIGATING CAP-TO-AA MOLE RATIO} |
|---|---|---|
| CAP-to-AA Mole ratio | Graft Polymer | Observed Tm |
| 0.63 | Ex. No. 16 | * |
| 0.76 | Ex. No. 13 | * |
| 0.88 | Ex. No. 14 | 37° C. |
| 1.00 | Ex. No. 15 | 37° C. |
| 1.26 | Ex. No. 17 | 34° C. |

From the data presented in Table XXX it appears that a CAP-to-AA mole ratio of more than about 0.76 is required to achieve crystallinity in the particular graft polymer produced as set forth hereinabove. (A CAP-to-AA mole ratio of 0.76 or less results in the graft polymer being amorphous.)

TABLE XXXI

| RESULTS OF INVESTIGATING CAP-TO-MAA MOLE RATIO | | |
|---|---|---|
| CAP-to-MAA Mole ratio | Graft Polymer | Observed Tm |
| 0.99 | Ex. No. 12 | 32° C. |
| 1.44 | Ex. No. 11 | 31° C. |

TABLE XXXII

| RESULTS OF INVESTIGATING DVL-TO-AA MOLE RATIO | | |
|---|---|---|
| DVL-to-AA Mole Ratio | Graft Polymer | Observed Tm |
| 1.50 | Ex. No. 22 | * |

TABLE XXXIII

| RESULTS OF INVESTIGATING PVL-TO-AA MOLE RATIO | | |
|---|---|---|
| PVL-to-AA Mole ratio | Graft Polymer | Observed Tm |
| 1.50 | Ex. No. 26 | * |

Those skilled in the art can, of course, appreciate that, in certain situations and for particular applications, it may be desirable that the graft polymer possess crystallinity. While in other situations and for different applications, it may be desirable for such a graft polymer to be semi-crystalline, or be totally amorphous.

What has been described herein is a novel process for producing an alkali-soluble, polyacid graft polymer. Also described herein is the polyacid graft polymer so produced. While the process together with the polymer have been described with reference to a number of preferred embodiments, the present invention is not limited thereto. On the contrary, alternatives, changes and modifications will become apparent to those skilled in the art upon reading the foregoing description. Accordingly, such alternatives, changes and modifications are to be considered as forming a part of the invention insofar as they fall within the spirit and scope of the appended claims.

We claim:

1. A process for producing an alkali-soluble graft polymer having at least one main chain and a plurality of side chains attached thereto, the process comprising the steps of:

combining, in a solvent contained within an agitated reaction zone, (1) at least one vinylic monomer that is capable of forming free radicals, (2) at least one ethylenically-unsaturated carboxylic acid monomer that is capable of addition-copolymerizing with the vinylic monomer in the presence of the thus-formed free radicals, and (3) cyclic ester molecules that are capable of ring-opening in the presence of the carboxylic acid monomer, thereby producing a reactant-initiatable polymerizable mixture; and subjecting the reactant-initiatable polymerizable mixture to a preselected temperature and pressure effective to cause the vinylic monomer and the ethylenically-unsaturated carboxylic acid monomer to free-radically addition-copolymerize to form the graft polymer one main chain and to cause the cyclic ester molecules to ring-open at the inner ester bonds thereof and to graft onto the polymer main chain, thereby forming the side chains of the graft polymer, the process being characterized in that the main-chain and side-chain formations of the graft polymer occur substantially simultaneously, the process further being characterized in that the graft polymer is formed expressly excluding utilization of a polymerization catalyst for the cyclic ester molecule.

2. The process in accordance with claim 1 wherein the solvent is selected from the group consisting of methyl amyl ketone, xylene, propylene glycol monomethyl ether acetate, toluene, cellosolve acetate, ethoxy ethyl acetate, diethyl cellosolve, ethyl benzene, and mixtures thereof.

3. The process in accordance with claim 1 wherein the solvent is selected from the group consisting of propylene glycol monomethyl ether acetate, ethyl benzene, methyl amyl ketone, xylene, and cellosolve acetate.

4. The process in accordance with claim 1 wherein the vinylic monomer is selected from the group consisting of vinyl toluene, alpha-methyl styrene, tertiary-butyl styrene, ortho-chlorostyrene, styrene, and mixtures thereof.

5. The process in accordance with claim 2 wherein the ethylenically-unsaturated carboxylic acid monomer is selected from the group consisting of maleic acid, itaconic acid, crotonic acid, acrylic acid, methacrylic acid, and mixtures thereof.

6. The process in accordance with claim 1 wherein the ethylenically-unsaturated carboxylic acid monomer is selected from the group consisting of methacrylic acid and acrylic acid.

7. The process in accordance with claim 1 wherein the cyclic ester is selected from the group consisting of gamma-butyrolactone, delta-valerolactone, pivalolactone, thio-butyrolactone, beta-butyrolactone, epsilon-caprolactone, and mixtures thereof.

8. The process in accordance with claim 1 wherein the cyclic ester is selected from the group consisting of epsilon-caprolactone, delta-valerolactone, pivalolactone, and thio-butyrolactone.

9. The process in accordance with claim 1 wherein the preselected temperature is about 160° to about 300° C.

10. The process in accordance with claim 1 wherein the preselected temperature is about 200° to about 240° C.

11. The process in accordance with claim 1 wherein the pressure is about 14.7 psia up to about 2000 psia.

12. The process in accordance with claim 1 wherein the pressure is about 14.7 psia up to about 300 psia.

13. The alkali-soluble graft polymer made in accordance with the process of claim 1.

14. The alkali-soluble graft polymer of claim 13 wherein the carboxylic acid monomer is acrylic acid, wherein the cyclic ester molecule is epsilon-caprolactone, and wherein the graft polymer possesses an epsilon-caprolactone to acrylic acid mole ratio of 0.76 or less.

15. The alkali-soluble graft polymer of claim 13 wherein the carboxylic acid monomer is acrylic acid, wherein the cyclic ester molecule is epsilon-caprolactone, and wherein the graft polymer possesses an epsilon-caprolactone to acrylic acid mole ratio of more than about 0.76.

16. An alkali-soluble graft polymer that is formed expressly excluding utilization of a polymerization catalyst, the graft polymer having a number-average molecular weight of about 500 to about 30,000 and which is structurally represented as:

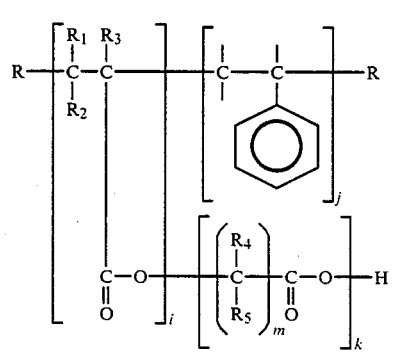

where R is an end-cap which is based upon an unstable Diels-Alder adduct that is selected from the group consisting of vinyl toluene, alpha-methyl styrene, tertiary-butyl styrene, ortho-chlorostyrene, styrene, and mixtures thereof;

where $R_1$ and $R_2$ are —H, —$CH_3$ or —COOH;

where $R_3$ is —H, —$CH_3$, —COOH, —$CH_2COOH$,

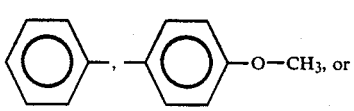

-continued
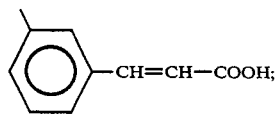
where $R_4$ and $R_5$ are —H or —CH$_3$;
where i and j are each about 1 to about 500;
where K is 0 to 50; and
where m is 2 to 11.
17. The graft polymer of claim 16 wherein the number-average molecular weight is about 750 to about 20,000.
18. The graft polymer of claim 16 wherein the number-average molecular weight is about 1,000 to about 10,000.
* * * * *

UNITED STATES PATENT AND TRADEMARK OFFICE
CERTIFICATE OF CORRECTION

PATENT NO. : 4,921,934

DATED : May 1, 1990

INVENTOR(S) : Kathleen J. Bixler
Kevin M. Scholsky

It is certified that error appears in the above-identified patent and that said Letters Patent is hereby corrected as shown below:

At col. 5, line 36, please change "sometines" to -- sometimes --.

At col. 15, line 8, please change "belived" to -- believed --.

At col. 19, line 46, please change "Mw-Mn" to -- Mw/Mn --.

At col. 35, line 43, please change "transistions" to -- transitions --.

At col. 35, line 48, please change "transistion" to -- transition --.

Signed and Sealed this

Ninth Day of April, 1991

*Attest:*

HARRY F. MANBECK, JR.

*Attesting Officer*   *Commissioner of Patents and Trademarks*